US010583853B2

(12) United States Patent
Brilhante et al.

(10) Patent No.: US 10,583,853 B2
(45) Date of Patent: Mar. 10, 2020

(54) DELIVERED PACKAGE SECURMENT SYSTEM

(71) Applicants: John Brilhante, Newark, NJ (US); Michael Donnelly, Basking Ridge, NJ (US)

(72) Inventors: John Brilhante, Newark, NJ (US); Michael Donnelly, Basking Ridge, NJ (US)

( * ) Notice: Subject to any disclaimer, the term of this patent is extended or adjusted under 35 U.S.C. 154(b) by 0 days.

(21) Appl. No.: 16/282,875

(22) Filed: Feb. 22, 2019

(65) Prior Publication Data

US 2019/0256119 A1 Aug. 22, 2019

Related U.S. Application Data

(60) Provisional application No. 62/633,657, filed on Feb. 22, 2018.

(51) Int. Cl.
*A47G 29/20* (2006.01)
*A47G 29/124* (2006.01)
(Continued)

(52) U.S. Cl.
CPC .......... *B62B 5/0495* (2013.01); *A47G 29/124* (2013.01); *B62B 1/125* (2013.01); *B62B 1/14* (2013.01); *B65D 2251/1058* (2013.01)

(58) Field of Classification Search
CPC .. A47G 29/1216; A47G 29/124; A47G 29/30; A47G 29/22; A47G 29/20;
(Continued)

(56) References Cited

U.S. PATENT DOCUMENTS 2,754,991 A * 7/1956 Hagerty ................. B61D 35/00
220/481
4,694,668 A 9/1987 Ciletti et al.
(Continued)

FOREIGN PATENT DOCUMENTS

CA 2423576 A1 * 3/2002 ........... A47G 29/141
CN 201211097 3/2009
(Continued)

OTHER PUBLICATIONS

International Search Report and Written Opinion, PCT/US19/019201, dated Apr. 26, 2019, pp. 1-12.

*Primary Examiner* — Allan D Stevens
(74) *Attorney, Agent, or Firm* — The Belles Group, P.C.

(57) ABSTRACT

A secure package delivery system comprises a lockable container configured for securement to a movable door or exterior wall of a building structure. The container includes a walled body and openable lid. A vertically and horizontally adjustable dolly handle assembly is slideably coupled to a rear of the body and operable to form an adjustable gap for receiving a portion of the door to trap and secure the container in place. The handle assembly is lockable in place to the container and in vertical position by a crank mechanism operated via a lever. The container further includes a movable securement aperture in the handle assembly and wall pin which permits securing the container to a wall via operation of handle assembly and crank mechanism. A movable latch operated by the crank mechanism secures the wall pin in the securement aperture to prevent removal of the container.

30 Claims, 24 Drawing Sheets

(51) Int. Cl.
*B62B 5/04* (2006.01)
*B62B 1/12* (2006.01)
*B62B 1/14* (2006.01)

(58) Field of Classification Search
CPC ........ A47G 29/16; A47G 29/14; A47G 29/12;
A47G 2029/142; A47G 2029/144; A47G
2029/148; B65D 2211/00; A63B 21/1645
USPC .................. 232/22, 19, 39, 45, 1 E; 206/1.5;
220/476, 481, 480, 629, 676
See application file for complete search history.

(56) References Cited

U.S. PATENT DOCUMENTS

| | | | |
|---|---|---|---|
| 4,703,850 A | 11/1987 | Walker | |
| 4,799,370 A | 1/1989 | Cooper | |
| 4,909,052 A | 3/1990 | Hutwohl | |
| 5,027,948 A | 7/1991 | Forbes et al. | |
| 5,150,834 A | 9/1992 | Bourke | |
| 5,347,833 A | 9/1994 | Branscum | |
| 5,624,071 A | 4/1997 | Sosan | |
| 5,979,750 A | 11/1999 | Kindell | |
| 6,135,305 A * | 10/2000 | Brady | A24F 19/0078 220/366.1 |
| 6,155,715 A * | 12/2000 | Lake | A47G 29/20 150/102 |
| 6,330,816 B1 | 12/2001 | O'Connor | |
| 6,375,070 B1 | 4/2002 | Snoke | |
| 6,612,489 B2 | 9/2003 | McCormick et al. | |
| 7,175,071 B1 | 2/2007 | Slagle et al. | |
| 7,246,738 B2 | 7/2007 | Jonas | |
| D644,814 S | 9/2011 | Clarke | |
| 8,336,759 B2 | 12/2012 | Skouboe | |
| D678,655 S | 3/2013 | Farentinos et al. | |
| 8,740,056 B2 | 6/2014 | Skouboe | |
| 9,371,681 B2 | 6/2016 | Tompkins | |
| 9,596,952 B2 | 3/2017 | Mencel | |
| 10,383,471 B1 * | 8/2019 | Barnes | A47G 29/124 |
| 2010/0253519 A1 | 10/2010 | Brackmann et al. | |
| 2014/0008246 A1 | 1/2014 | Pfeiffer | |
| 2016/0051073 A1 | 2/2016 | Heinz et al. | |
| 2016/0309939 A1 * | 10/2016 | Mencel | A47G 29/20 |
| 2018/0296016 A1 * | 10/2018 | Teoh | A47G 29/20 |

FOREIGN PATENT DOCUMENTS

| | | | | |
|---|---|---|---|---|
| CN | 205855212 U | | 1/2017 | |
| DE | 10033664 A1 | * | 9/2001 | ........... A47G 29/141 |
| DE | 102014017191 A1 | | 3/2016 | |
| DE | 202016003575 U1 | | 8/2016 | |
| DE | 102015003042 A1 | | 9/2016 | |
| EP | 1105604 B1 | | 3/2002 | |
| EP | 2801302 B1 | | 10/2016 | |
| GB | 2487595 A | | 8/2012 | |
| JP | 04327180 A | * | 11/1992 | |
| WO | WO-0151744 A2 | * | 7/2001 | ........... A47G 29/141 |
| WO | WO 2003/036573 A2 | | 5/2003 | |
| WO | WO 2011043542 A2 | | 4/2011 | |
| WO | WO-2012175967 A1 | * | 12/2012 | ........... A47G 29/141 |
| WO | WO 2016/046732 A1 | | 3/2016 | |

\* cited by examiner

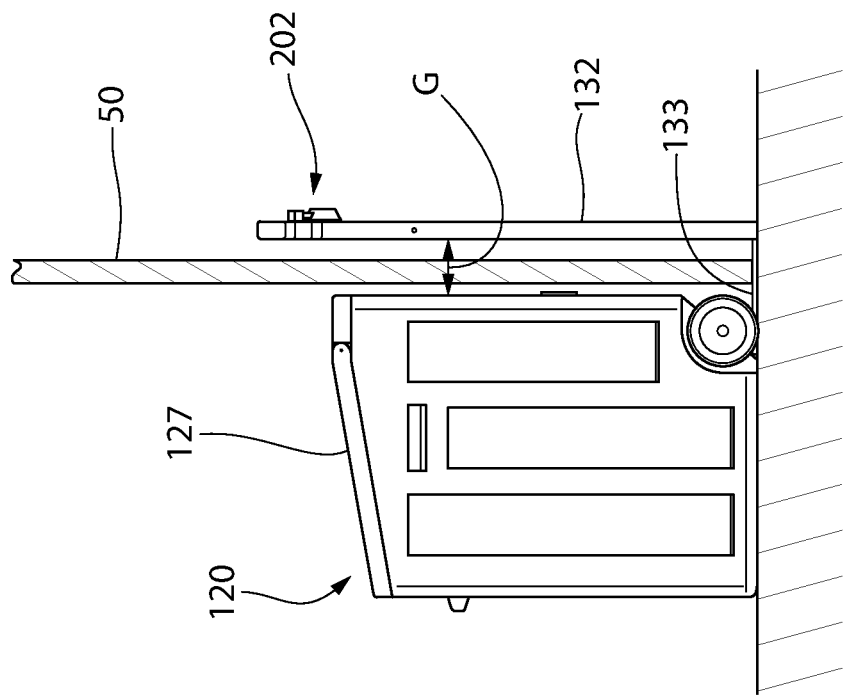
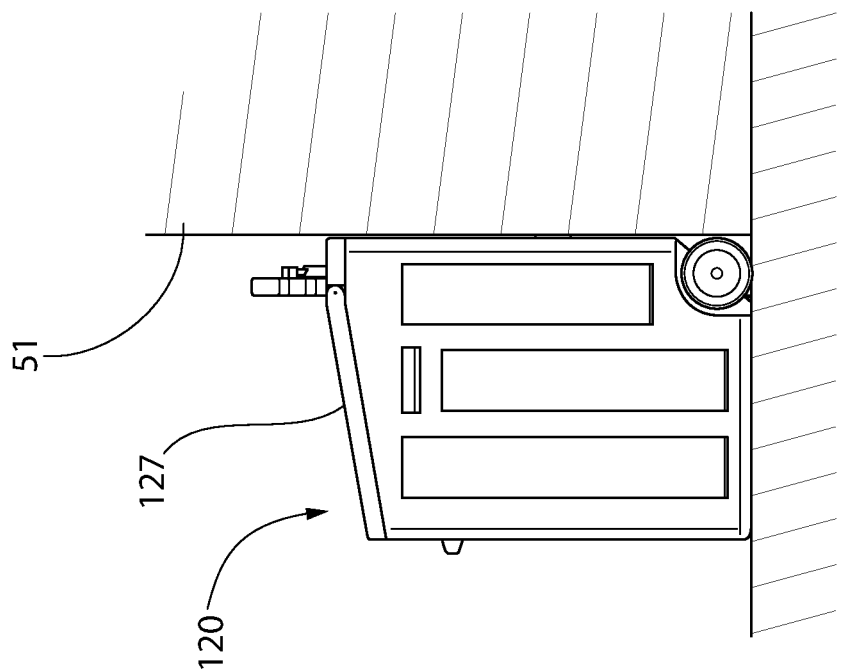

DELIVERED PACKAGE SECURMENT SYSTEM

CROSS-REFERENCE TO RELATED APPLICATIONS

The present application claims the benefit of U.S. Provisional Application No. 62/633,657 filed Feb. 22, 2018; the entirety of which is incorporated herein by reference.

BACKGROUND

The present invention generally relates to package container securement system, and more particularly to such a system comprising a lockable package container adapted for removable mounting to a door or wall of a building.

Unattended packages are an invitation for criminals looking for a fast and easy target. In short, package theft has become a pandemic. According to major media outlets, an estimated 11 million packages were stolen in the United States for the calendar year ending October 2016. Even more alarming, more than half of all Americans say they know someone who has had a package stolen from outside their home. The internet is littered with videos of package thefts captured on home surveillance "security" systems. The current techniques being used simply are not deterring these "porch pirates" from making their next unauthorized "pick up" at someone's home.

As retailers increase their online presence, the cost of replacing stolen items can quickly increase and actually end up costing retailers more in the long run. On a related note, online sales of high-value items, such as electronics, will not reach its true potential until consumers know there is a secure delivery method in place. The convenience and savings of online shopping loses its allure when customers are victimized. The inconvenience of stolen packages is compounded by the hassle of filing lost package claims and/or police reports. In the case of mail order prescription drugs, the consumer may go without their required medication until a replacement can be secured. These inconveniences can create a negative rapport between the retailer and the consumer, at no fault of either party.

Prior approaches sometimes require direct attachment of delivery box and mounting hardware to a dwelling structure or access door, such as via threaded fasteners or other means. This not only damages the structure or door, but requires permanent attachment meaning that the consumer cannot readily remove the delivery box if not required for a package delivery. This may interfere with normal use of a door for a prolonged period of time.

Improvement in delivered package security is required.

SUMMARY OF THE INVENTION

Disclosed is a lockable package container which allows consumers to securely receive and temporarily store deliveries of household products or goods, including perishable foods. The container can be utilized by consumers living in both urban and suburban areas alike to protect their packages from the outdoor elements and potential thieves. The container in one embodiment comprises a dual securement system adapted for use with either a movable feature or object of a building structure, or alternatively an immovable stationary/fixed feature or object of the building structure. Accordingly, the dual mounting options are advantageously provided for the user to suit personal preferences and available features of the building structure to which the lockable package container may be secured.

First, the container is configured for removable securement to an openable/closeable garage door without physically attaching hardware to the door. In one embodiment, the container includes a securement member which is trapped beneath the door when closed. This restrains the container in a manner which prevents the container form being removed while the door remains closed. When the door is opened, the container may be easily transported and unlocked to access the package(s).

Second, the container is further configured for removable securement to an available and externally accessible non-movable or stationary exterior wall of the building.

The lockable package container therefore conveniently allows delivery companies to securely deliver virtually any type package, including those requiring an electronic signature via provided scannable bar codes or other indicia as further described herein, by placing them inside the secured package container and locking the container with a provided lock.

The present package container is designed with specific goals in mind: ease of installation; ease of use; lightweight; secure; weather-proof; and cost-effective for the retailer, delivery company, and consumer. Each container design is simple, yet revolutionary in transforming ordinary home package delivery into a convenient, secure method for receiving almost any type of household goods. The package container provides homeowners and business owners with complete peace-of-mind without the need to permanently affix any unsightly containers to their home or property.

The lockable package container may be manufactured in various sizes to suit a user's needs and accommodate the size and/or quantity of packages to be delivered. For example, there is a large container that is ideal for grocery deliveries. Smaller containers may be appropriate for delivery of prescription medications, electronic devices, or other packages. As an option, a removable insulated liner may be provided that assists with temperature control. In one embodiment, the liner may be constructed of foam insulation; however, other insulating materials may be used.

The package container may be made of any suitable non-metallic material, metallic material, or combinations thereof. In one embodiment, the container may be made of a polymer of suitable strength and rigidity such as without limitation a polypropylene copolymer or similar material to allow for protection from outdoor elements and physical damage by thieves. The containers rugged construction protects the container's package contents from animals, inclement weather, and contamination.

Installation of the package container takes seconds without the need of any hardware or tools. The package container may be non-permanently restrained by any type door system (i.e. exterior access door or garage door) by using the door system's own mechanics. The customer has complete access to move their container simply by opening their exterior access door or garage door. The container's design ensures that it is secured to the door system and cannot be moved until the door is opened by the homeowner or business owner. In some uses, the container may be only deployed in the anticipation of delivery by removably securing the securement member of the container beneath the door. This method eliminates the need to permanently mount a container to the home or business owner's property.

Each container includes an openable closure panel which may be movably or removably mounted on an open side or top of the container. In one embodiment, the closure panel may be a hinged lid mounted to selectively open or close a top of the container. An indentation may be provided on the front of the lid to facilitate grasping and opening. The hinge system may utilize barrel type hinges in one embodiment for opening and closing the lid of the container. In other implementations, a completely removable lid and latching system may be provided instead. In use, the package container will normally be in a closed position at all times, but is designed to remain open when raised for access to the interior cavity of the container. The container may optionally remain in an unlocked state until the lock is activated by the owner or by delivery person after placement of a package therein.

The lid and container may be configured to accommodate a wide variety of manual or electronic locking systems. In various embodiments, a mechanical key lock may be used. In other embodiments, an electronically activated lock may be used which is opened via a keypad combination, a radio signal generated by an access card or key fob, or other electronic means. Electronic locks if used may be battery powered.

In one aspect, a secure package delivery system comprises: a container comprising: a multi-walled container body defining a front wall, a rear wall, a pair of sidewalls, and an interior cavity configured for receiving at least one package, the container further comprising an openable and closeable lid coupled to the container body; a handle assembly comprising a base member slideably coupled to the container body and a vertical handle member, the handle assembly configured to form an adjustable upwardly open gap configured for receiving a lower portion of a door therein; the handle assembly horizontally movable forward into an inward position closing the gap and rearward into an outward position opening the gap; a crank mechanism mounted to the vertical handle member, the crank mechanism comprising a pair of locking pins operably coupled to a rotatable lever by a linkage, the locking pins laterally movable via rotating the lever between retracted and projected positions; wherein rotating the lever in a first direction to a first position projects the locking pins outwards to engage the rear wall and lock the handle assembly in the inward position; wherein rotating the lever in a second direction to a second position retracts the locking pins inwards to disengage the rear wall and allow movement of the handle assembly to the outward position. In one embodiment, the lid may be hingedly coupled to the container body.

In another aspect, a secure package delivery system comprises: a container comprising: a multi-walled container body defining a front wall, a rear wall, a pair of sidewalls, and an interior cavity configured for receiving at least one package; an openable and closeable lid coupled to the container body; a handle assembly comprising a base member slideably coupled to the container body and vertical handle member slideably coupled in turn to the base member; the vertical handle member horizontally movable forward and rearward relative to the rear wall between an inward position adjacent the rear wall, and an outward position spaced apart from the rear wall; the vertical handle member further vertically moveable relative to base member between upper extended and lower collapsed positions; the vertical handle member further comprising a rearwardly open securement aperture arranged for receiving a wall pin configured for mounting the container to a wall, the securement aperture including an enlarged entrance portion configured to receive the wall pin when the vertical handle member is in the upper extended position, and a narrower locking portion configured to lock the wall pin to the container when the vertical handle member is in the lower collapsed position.

In another aspect, a secure package delivery system comprises: a container comprising a multi-walled container body defining a front wall, a rear wall, a pair of sidewalls, and an interior cavity configured for receiving at least one package, the container further comprising: an openable and closeable lid coupled to the container body; a vertically telescoping handle assembly comprising a base member slideably coupled to the container body and vertical handle member slideably coupled to the base member; a vertically-extending rear channel recessed in the rear wall, the vertical handle member horizontally movable forward and rearward into and out of the rear channel; the handle assembly movable to form an adjustable upwardly open gap between the rear wall and the vertical handle member when the vertical handle member is positioned outside the rear channel for receiving a lower portion of a door therein; a rearwardly open securement aperture formed in the vertical handle member, the securement aperture adjustable in vertical position via raising and lowering the vertical handle member; the securement aperture including an enlarged entrance portion configured to receive a wall pin therethrough when the vertical handle member is in an upper extended position, and a narrower locking portion configured to lock the wall pin to the container when the vertical handle member is in a lower collapsed position; and a crank mechanism mounted to the vertical handle member, the crank mechanism comprising a pair of locking pins operably coupled to a rotatable lever by a linkage; the locking pins selectively movable via rotating the lever between a projected position engaging locking holes in the container body to lock the handle assembly in vertical position to the container, and a retracted position disengaged from the locking holes to allow vertical adjustment of the handle assembly.

BRIEF DESCRIPTION OF THE DRAWINGS

The features of the exemplary embodiments will be described with reference to the following drawings where like elements are labeled similarly, and in which:

FIG. 28 is a side view of the container secured to an exterior wall of a building structure; and FIG. 29 is side view of the container secured to an openable/closeable exterior door of the building structure.

Figure 1:
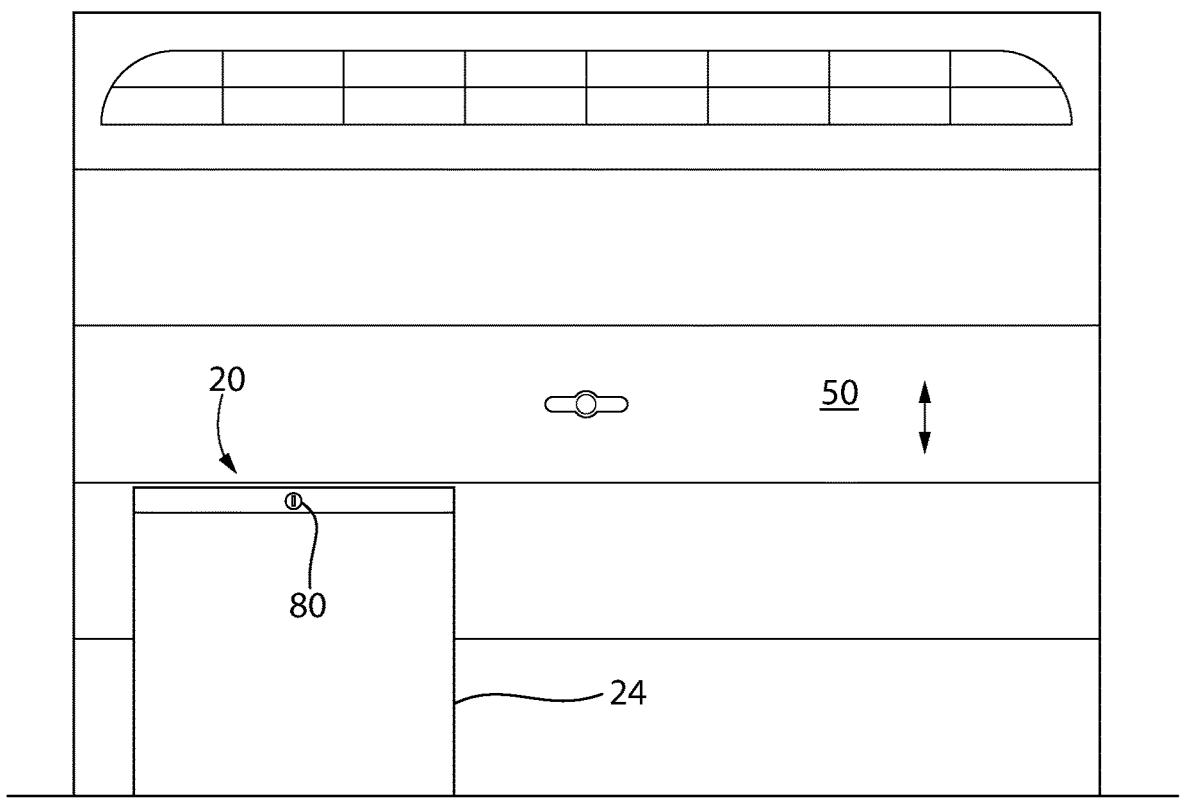
FIG. 1 is a front view of a secure delivered package container constructed in accordance with a first embodiment of the present invention.

All drawings are schematic and not necessarily to scale. Parts shown and/or given a reference numerical designation in one figure may be considered to be the same parts where they appear in other figures without a numerical designation for brevity unless specifically labeled with a different part number and described herein.

DETAILED DESCRIPTION OF EMBODIMENTS

The features and benefits of the invention are illustrated and described herein by reference to preferred but non-limiting exemplary ("example") embodiments. This description of the embodiments is intended to be read in connection with the accompanying drawings, which are to be considered part of the entire written description. Accordingly, the invention expressly should not be limited to such embodiments illustrating some possible non-limiting combination of features that may exist alone or in other combinations of features; the scope of the invention being defined by the claims appended hereto.

In the following description, for purposes of explanation, numerous specific details are set forth in order to provide a thorough understanding of example embodiments. It will be evident to one skilled in the art, however, that embodiments can be practiced without these specific details, or with various combinations of these details.

In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures may be secured or attached to one another either directly or indirectly through intervening structures, as well as both movable or rigid attachments or relationships, unless expressly described otherwise.

Referring to FIGS. 3-6, the lockable package container 20 may have a multi-walled body shaped as square or rectangular prism or cuboid in some embodiments. The body comprises a horizontal bottom wall 21 and four vertical sidewalls extending upwards from the bottom wall including a front wall 22, opposing rear wall 23 (i.e. side facing the door when the container is in use), and a pair of opposing lateral walls 24 extending between the front and rear walls. The walls collectively define an interior space or cavity 25 for holding packages. In one embodiment, the top 26 of the container is open for inserting and removing packages. The open top 26 in a preferred construction is selectively closed by a closure panel which may be an openable/closeable lid 27 hingedly and pivotably coupled to the rear wall in one embodiment. Any suitable type hinge 28 or pair of hinges may be used, including for example without limitation a pair of butt hinges, piano hinge, or other. In such an arrangement, the lid 27 remains pivotably coupled to the container body at all times. In other embodiments, the closure panel or lid may be instead completely removable and latched in position on the body of the container, such as for example a latches, interlocking tab and slot arrangement, or other suitable mechanically fastening and interlocking features.

In one embodiment, the body of the container (i.e. bottom wall and sidewalls) may be formed as a monolithic unitary structure. In one embodiment, the body may be formed of a suitable polymer, which may be injection molded or otherwise formed.

The rear wall 23 of the container 20 includes a securement member 30 which protrudes rearwards from a bottom portion the rear wall for a distance. The securement member 30 is configured to receive and engage the bottom edge and lower portion of the door 50 therein to lock the package container in place in a manner which prevents unauthorized removal. The securement member may be generally L-shaped in one embodiment having a front end 31 fixedly attached to or formed integrally as a unitary structural part of the bottom and/or rear walls 21, 23 of the container at their juncture, and a top end 32 which may lie in a different higher horizontal plane than the front end lying substantially in the same horizontal plane as the bottom wall. The securement member 30 includes a horizontal portion 33 and a vertical portion 34 which may continue upwards at a 90-degree angle to the horizontal portion and terminate at its top end in a handle configured for grasping by a user. The vertical portion 34 may be contiguously and integrally formed with the horizontal portion 33 in some embodiments such that the two portions are not movable relative to each other. In other embodiments, the vertical portion 34 may optionally be pivotably coupled to and movable relative to the horizontal portion 33 by a pivot rod or pin 35, which may form the axle on which the wheels 60 are mounted (see, e.g. FIG. 2).

The vertical portion 34 of the securement member 30 is spaced horizontally spaced apart from the rear wall 23 of the container thereby forming a securement gap G therebetween configured to receive and entrap the lower portion of the door when closed. In one non-limiting example, the securement gap G may be at least 2 inches wide which is sufficient to accommodate the thickness of an exterior access doors or garage door (see, e.g. FIGS. 3-6). The size of the gap will be dictated by the thicknesses of the doors to be used with the container and may be varied accordingly to accommodate thicker or thinner doors. Preferably, the width of the gap G is not overly large to keep the container in close proximity to the exterior of the door to improve tamper resistance.

Figure 4:
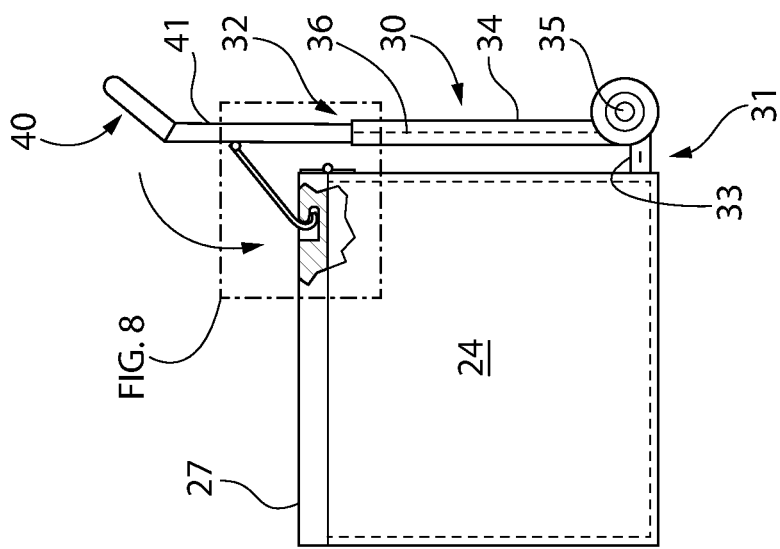
FIG. 4 is a side view thereof showing the handle assembly in an upper extended position.
Figure 3:
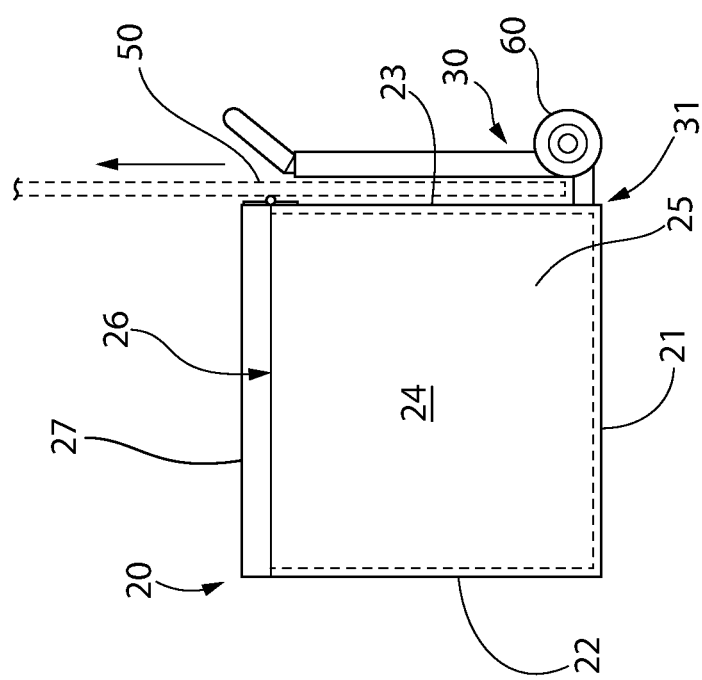
FIG. 3 is a side view thereof showing the handle assembly in a lower collapsed position.
Figure 5:
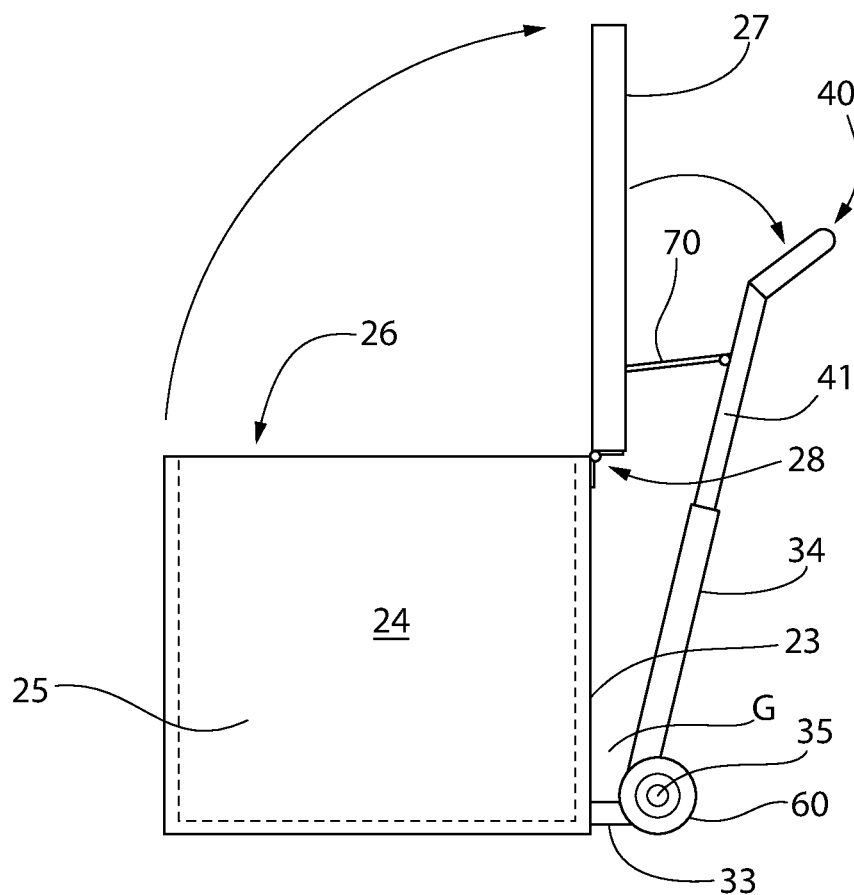
FIG. 5 is a side view thereof showing the handle assembly in a tilted or angled position.
Figure 6:
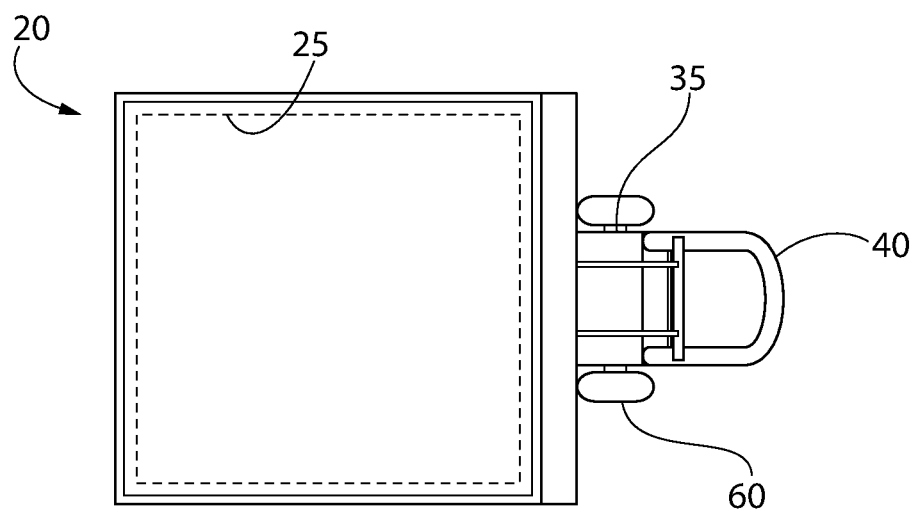
FIG. 6 is a top view thereof.

In one embodiment, a telescoping handle 40 is slideably received inside and coupled to the vertical portion 34 of the securement member 30 through top end 32. Handle 40 is vertically movable relative to the stationary vertical portion 34 and configured to form a extendible/retractable handle to facilitate use and storage of the package container (see, e.g. FIGS. 3 and 4). The handle 40 may comprise a pair of vertical guide tubes 41 of any suitable cross-sectional shape (e.g. round, square, rectangular, etc.) which are integrally formed as a unitary structural part thereof or fixedly attached via welding. The bottom end of the guide tubes 41 are slideably received in upwardly open sockets formed in top end 32 of the stationary vertical portion 34 of securement member 30. The handle 40 of the package container is moveable between a lower retracted position (FIG. 3) and an upper extended position (FIG. 4). A locking mechanism may be provided to lock the handle 40 in at least the extended position. In other embodiments, the locking mechanism may be omitted. In one configuration, the top portion of handle 40 is configured for grasping and includes a horizontal portion obliquely angled to the lower vertical portion 34 of the securement member 30.

In one embodiment, the securement member 30 may be formed as an integral unitary structural part of the monolithic main body of the package container 20. In one embodiment, the body and securement member may therefore be formed of polymer. In contrast to vertical portion 34, the horizontal portion 33 of the securement member 30 preferably may be relatively thin by comparison in the vertical dimension having a small vertical thickness to allow the door 50 to substantially or completely close when its bottom edge engages the top of the horizontal portion.

In some implementations, the securement member 30 may be metal reinforced to provide additional strength and tamper resistance via a polymer over metal overmolding process. An internal metallic substrate 36 of suitable configuration may be at least partially or completely overmolded and embedded in the polymer main body of the container and at least the horizontal portion of the securement member which extends beneath the door when closed. In some embodiments, the metallic substrate may extend through the horizontal portion and upwards at least partially into the vertical portion of the securement member as well for additional reinforcement. The metallic substrate 36 may have various shapes, including for example without limitation: (a) an L-shaped metal bracket with a forward part of the bracket embedded in the bottom wall of the package container and the remainder extending through the horizontal portion and at least part of the vertical portion of the securement member; (b) a U-shaped metal bracket having one vertical leg of the "U" embedded in the rear wall of the container and the remainder extending through the horizontal portion and at least part of the vertical portion of the securement member; or (c) a linearly straight metal strap with a forward part of the bracket embedded in the bottom wall of the package container and the remainder extending through the horizontal portion of the securement member. The metallic substrate may comprise a single or multiple pieces embedded in the polymer container and securement member. The polymer overmolded metallic substrate advantageously provides strength while preventing damage to the painted surface of the door when the package container is used.

In other possible embodiments contemplated, the securement member 30 may be formed as a separate or discrete U-shaped or L-shaped metallic part which is fixedly attached to the body of the container by any suitable mechanical means, such as for example without limitation fasteners (e.g. threaded fasteners, rivets, etc.).

Figure 7:
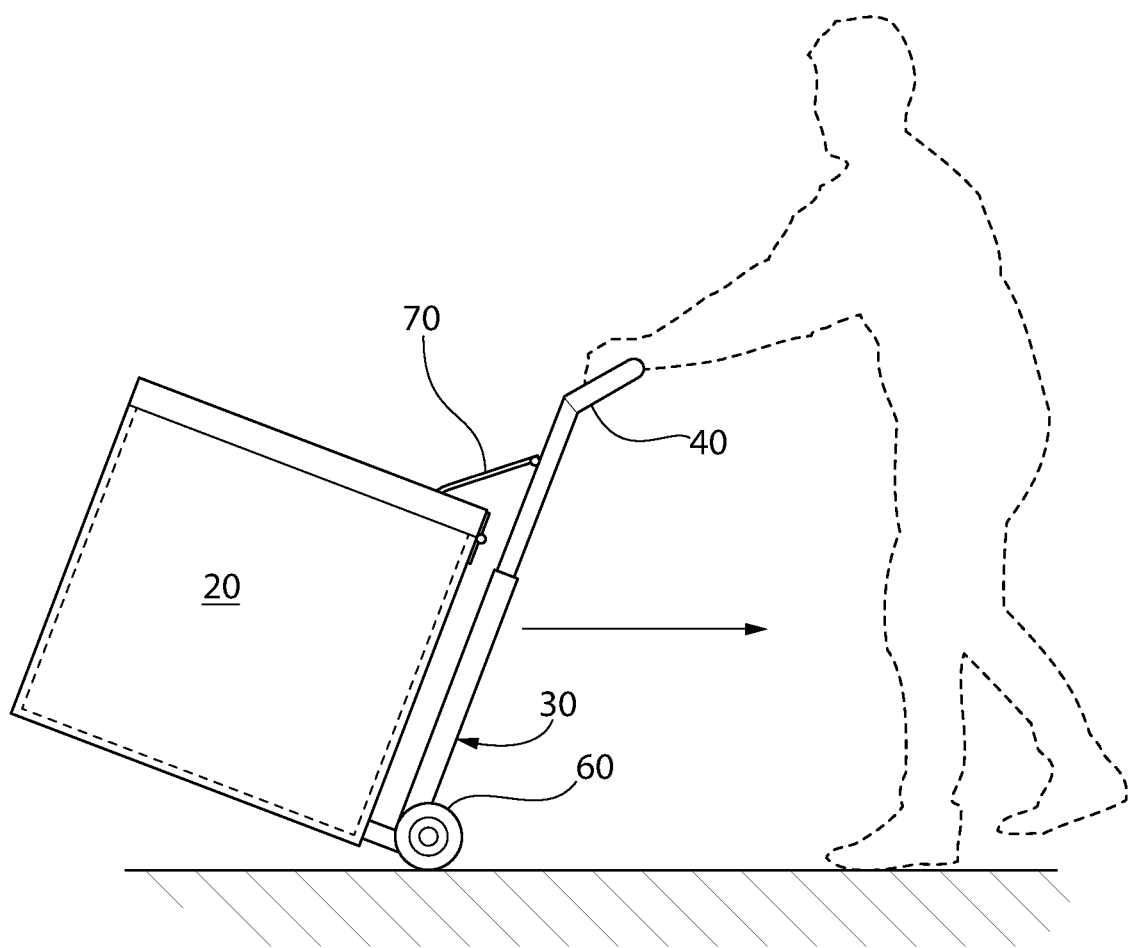
FIG. 7 is side view thereof showing the container transported along a horizontal support surface.

To facilitate transport particularly when filled with heavy parcels or packages, the package container may include a pair of wheels 60 rotatably mounted proximate to rear bottom corner of the package container. In one embodiment, the wheels 60 may be mounted to securement member 30 on a portion which is located on the interior side of the door near its bottom edge when closed. The wheels 60 may be rotatably mounted on one or more axles such as elongated pin 35 near the corner juncture of the horizontal and vertical portions 33, 34 of the securement member 30 (e.g. where the 90 degree angle is formed therebetween (see, e.g. FIGS. 3-6). Any suitable type wheel may be used including rubber wheels, plastic wheels, roller blade or luggage wheels, etc. The wheels allow the user to easily maneuver the container into and out of position as well as to transport the package container across a floor surface like a wheeled dolly (see, e.g. FIG. 7).

Figure 8:
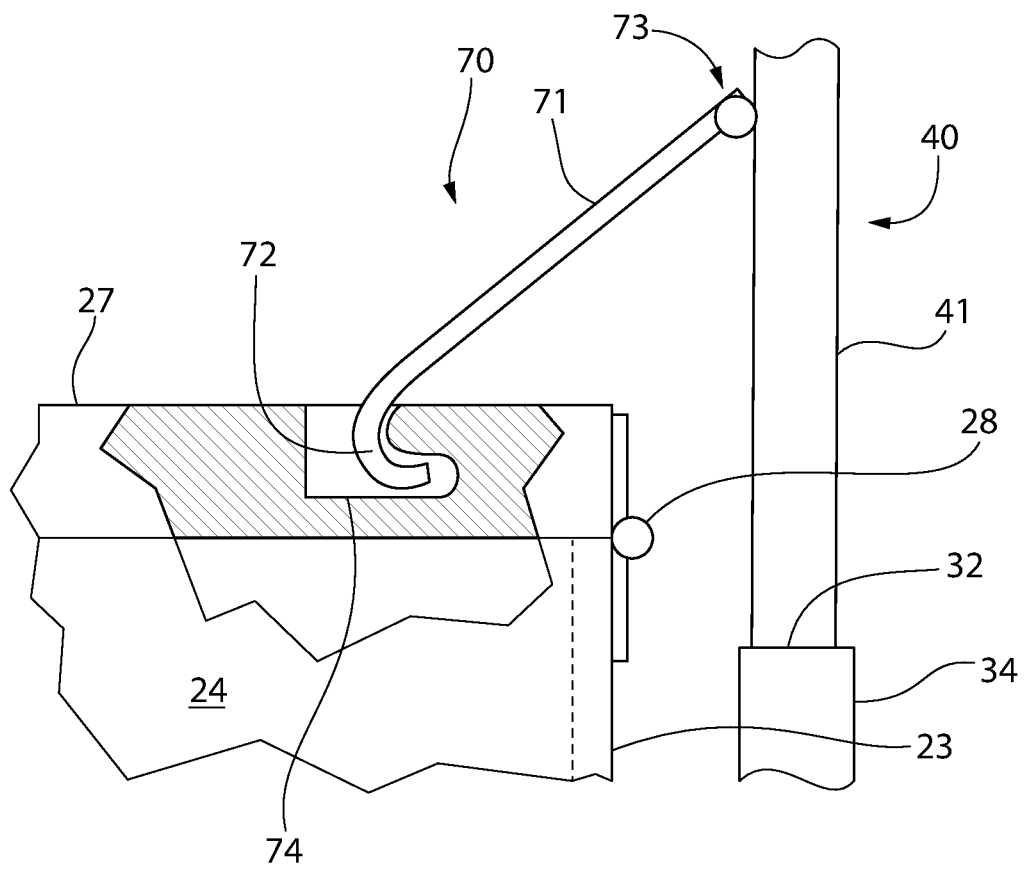
FIG. 8 is a detailed view taken from FIG. 4 showing the retractable retaining hook.

In some embodiments, an elongated and retractable retaining hook 70 (see, e.g. FIGS. 4-6) may be provided which can be located generally near or below the top of the handle 40. The retaining hook 70 provides additional support for the upper handle portion when the package container is wheeled into and out of position beneath the door. The retaining hook also in turn fixes the angular orientation of the vertical portion 34 of securement member 30 relative to the container rear wall 23 (see, e.g. FIG. 5). In one embodiment, the retaining hook 70 has an elongated rod or strap like rigid body 71 including a front hooked end 72 releasably engaged with a mating engagement feature or surface on the top, rear or lateral walls of the package container, and a rear mounting end 73 pivotably attached to the tubes 41 of the handle 40. In one embodiment, the top of the movable container lid 27 may have an upwardly open locking indentation or recess 74 near the rear in order to secure the retractable retaining hook to the package container. Recess 74 has a complementary configured shape creating an edge or lip configured to positively engage the hooked end 72 of the retaining hook 70 (see, e.g. FIG. 8). In other embodiments, a pin shaped member or protrusion may be formed on the package container as the engagement feature for the retaining hook. Other configurations of engagement features are possible.

In one embodiment, a pair of retaining hooks 70 may be provided; one on each tube 41 of handle 40. The retaining hook(s) may be pivotably mounted to either the movable handle 40 of the securement member as show, or alternatively the stationary vertical portion 34 of the securement member 30 if extended vertically in dimension by a sufficient amount to form the pivot axis for the hook which is above the hinge 28 of the container 20. The retaining hook(s) can be used to secure the handle to the package container at the user's discretion for use when moving the container to a different location. This creates a more rigid or solid structure for transport when wheeling the container across the floor which prevents bending of the handle portion relative to the container body. The container 20 may therefore be used in a similar manner as a wheeled dolly.

The package container 20 will be completely secure when any type of door is either lowered directly and vertically into the space or securement gap between the container and the handle portion of the securement member (e.g. garage door), or laterally slid into place beneath a side hinged door (e.g. exterior access door) in the same space or gap. The inside of the lid may include use a rubber peripheral gasket system to further ensure climate control and impede ingress of debris and/or moisture into the package container.

In operation when the homeowner or business owner opens the door 50, the container 20 will be automatically released. Once released, the handle 40 can then be extended and function as a dolly or hand cart. When retaining hooks 70 are optionally provided, the hooks may be latched to the package container for added support for moving the container. A pair of wheels 60 are integrated into the design which facilitates translation and movement of the container across a horizontal or inclined surface.

The package container 20 preferably includes a locking mechanism 80 to securely lock the lid 27 in the closed position to the container body and secure any packages delivered and placed inside container by a delivery person. The locking mechanism 80 may be a conventional mechanical lock with access key, or an electronically-operated lock in other embodiments. The homeowner or business owner has an access device to unlock the container 20, such as key, electronic key card/fob, or other device operable to unlock and to open the container. The delivery person has second same type access device to unlock and lock the container 20.

Figure 2:
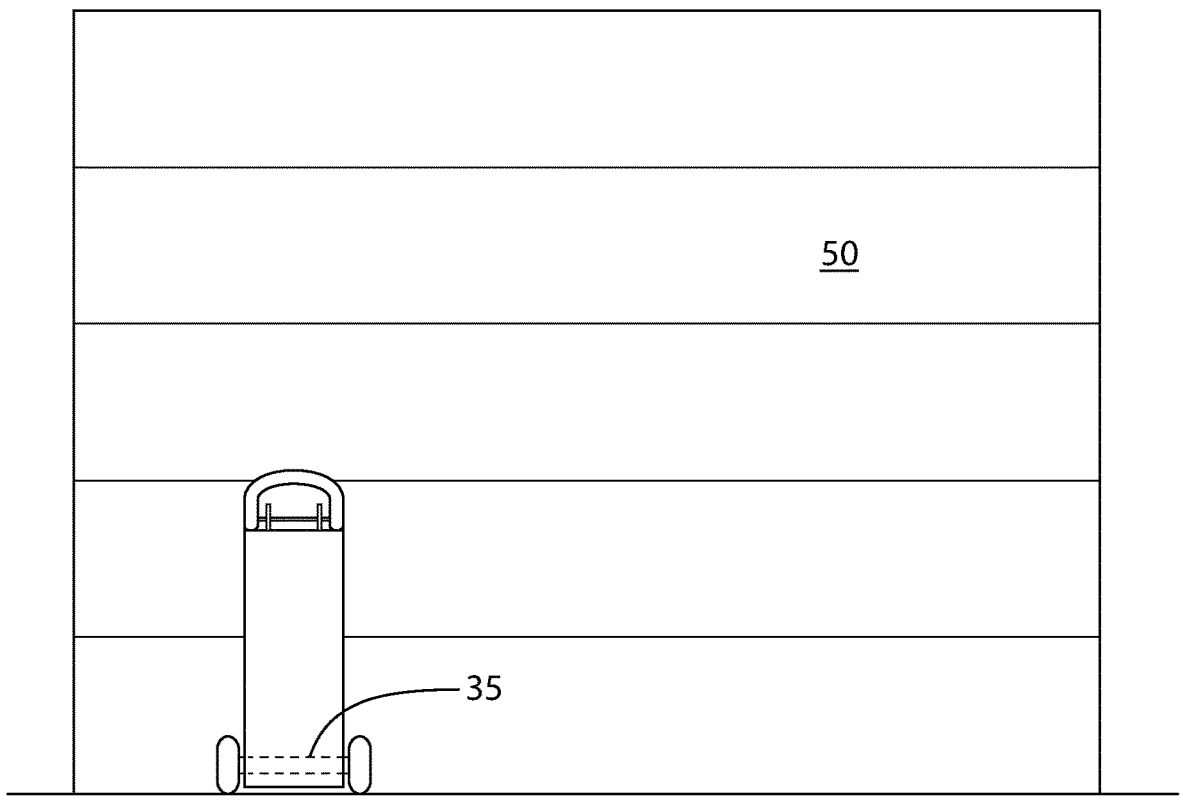
FIG. 2 is a rear view thereof.

FIGS. 1 and 2 show exterior and interior view of openable/closeable garage door 50. When the container 20 is secured beneath the door by securement member 30 (see also FIG. 3), only the secure container 20 is visible from outside. The horizontal portion 33 of the securement member is trapped beneath the door. The vertical portion of the securement member, telescopic handle 40, and wheel are safely positioned inside the door. If a thief attempts to pull the container 20 out from under the door 50, the structurally sturdy vertical portion 34 will engage the interior of the door to prevent removal of the container.

Referring to FIGS. 9-28 show a second embodiment of a lockable package container 120 may have a multi-walled body shaped as a square or rectangular prism or cuboid in some embodiments. The basic box-like structure of container 120 and some appurtenances may be somewhat similar to container 20 previously described herein. However, there are several distinct features of this second embodiment.

Container 120 has a body comprising a horizontal bottom wall 121 and four vertical sidewalls extending upwards from the bottom wall including a front wall 122, opposing rear wall 123 (i.e. side facing the door when the container is in use), and a pair of opposing lateral walls 124 extending between the front and rear walls. The walls collectively define an interior space or cavity 125 for holding packages. A front handle 127-2 may be provided on the upper portion of front wall 122 to facilitate maneuvering the container into place, or lifting the container in conjunction with handle assembly 130. For convenience of reference, container 120 defines a vertical centerline axis VA and a horizontal centerline axis HA intersecting axis VA at the geometric center of the container. The top 126 of the container is open for inserting and removing packages. The open top 126 may be selectively open or closed by openable/closeable lid 127. In one embodiment, lid 127 may be hingedly and pivotably coupled to the container body by hinges 128 for convenience of operation. In other embodiments, lid 127 may be configured for complete removal from the top 126 of the container. In one embodiment, a pair of hinges may be used as shown. Any suitable type of hinge assemblies may be used.

In one embodiment, hinges 128 may each be a barrel type hinge including a first hinge member 128-2 coupled to the lid 127. The first hinge members 128-2 may be fixedly attached to or molded with the container body as a monolithic unitary structural part thereof. If separate components, first hinge member 128-2 may be secured to the top 126 of the container body via any suitable mechanical fastening means, such as for example without limitation adhesives, ultrasonic welding, fasteners, or others. First hinge members 128-2 each define one or more barrels 128-4 which are interspersed between one or more barrels 128-3 formed on the rear of lid 127. In one construction, first hinge members 128-2 includes a single barrel 128-4 and the lid includes a pair of spaced apart inboard and outboard barrels 128-3 which receive barrel 128-4 therebetween. The barrels each define conventional through-bores which become concentrically aligned when the barrels are intermeshed. Hinge pins 128-1 inserted through the barrels pivotably couple the barrels together in the usual manner to pivotably mounted the lid 127 to the container 120. To prevent removal of the hinge pins 128-1 by would-be thieves, the inboard barrels 128-3 of the lid may each have a blind end so that the bore do not extend completely through the inboard barrels. This prevents a thief from using a pin punch to drive the pins out of the hinges to remove the lid. If both end of the pins are exposed in other embodiments, the ends of the pins may be mechanically flattened at each end to preclude use of a pin punch.

Once mounted to container 120, the lid 127 remains permanently and pivotably coupled to the container body at all times. In other embodiments, lid 127 may be completely removable from the top 126 of container 120. Preferably, the lid 127 forms a water-resistant enclosure with the container body to prevent or minimize the ingress of water when exposed to the outdoor elements. In some embodiments, the top 126 of the container may include an optional rectangular or square annular weather gasket 127-1 (represented by a dashed-line segment in FIG. 11) which forms a sealed interface with the lid 127. The gasket further operates to retain heat or cold within the container if optionally insulated.

In contrast to container 20, the present container 120 includes a securement member in the form of a dolly handle assembly 130 which is slideably mounted to the container. Handle assembly 130 is horizontally movable relative to the container body (e.g. rear wall 123) between a stowed inward position and an active outward position. In the outward position, the handle assembly 130 is operable to form an upwardly open adjustable gap G configured to receive and engage the bottom edge and lower portion of the door 50 (e.g. garage door) to lock the package container 120 in place in a manner which prevents unauthorized removal, as previously described herein. Handle assembly 130, however, includes multiple functional features beyond simply securement to the door as further described hereafter.

In one embodiment, handle assembly 130 may includes a securement base member 131 slideably coupled to the container 120 (as further described herein) and a vertical handle member 132. Base member 131 may be generally L-shaped including a horizontal securement portion 133 and a vertical mounting portion 134 extending upwardly from and perpendicularly oriented to the securement portion for coupling handle member 132 thereto.

The securement and mounting portions 133, 134 may be generally planar and laterally broad structures having respective widths equal to or greater than one-third the lateral width of the container 120 measured between the external surfaces of one lateral sidewall 124 to the opposing lateral sidewall across rear wall 123. The broad width of the base member 131 relative to the container ensures secure entrapment of the base beneath the door 50 when deployed. In one embodiment, the securement and mounting portions 133, 134 may have a width equal to or greater than one-half the lateral width of container. Securement portion 133 may have a horizontal length (measured transversely to its lateral width) which is commensurate with a vertical height of the mounting portion 134 (measured transversely to its lateral width). Other dimension may be used for the base member 131 in other possible embodiments.

Horizontal securement portion 133 may preferably be fixedly attached to vertical mounting portion 134 of base member 130 in a rigid manner, or formed integrally as a unitary structural part of the mounting portion 134 to provide a structurally rigid construction resistant to bending to secure the container 120 in place to door 50. Accordingly, if a thief attempts to remove the container 120 from securement beneath a door (e.g. garage door), the base member 131 will not yield and deform sufficiently to permit removal. In one embodiment, the base member 131 may be formed of flat or planar metal sheets or plate of sufficient thickness and material to resist undue bending The vertical handle member 132 of handle assembly 130 has a generally planar body including a lower mounting portion 138 and opposite upper handle portion 137. The mounting portion 138 may account for a majority of the vertical height of the handle member. Handle portion 137 is configured for grasping by the user and may include a horizontal handle 137-1. Handle 137-1 may have a closed loop configuration in some embodiments as shown which is convenient for grasping and wheeling the container to the desired location. The handle portion 137 may be laterally wider than the lower mounting portion 138 to further facilitate easy grasping and maneuvering of the container.

The base member 131 of handle assembly 130 may be slideably coupled to the handle member 132 in one embodiment to allow extension and retraction of the handle member. Handle member 132 is vertically movable relative to the base member 131, which in turn is horizontally movable relative to the container 120. In one embodiment, mounting portion 138 of handle member 132 defines a downwardly open internal cavity 135 which slideably receives mounting portion 134 of base member 131. In one embodiment, mounting portion 138 may have a laterally broad body which may be slightly larger in width than the lateral width of the mounting portion 34 of base member 131 so that cavity 135 is wide enough for this purpose. Cavity 135 in turn is slightly larger than the lateral width of base member mounting portion 34 to provide a slideable coupling to the handle member 132 which avoids excessive lateral play or movement in the cavity. This ensures smooth movement of the handle member 132 relative to the base member 131.

Handle member 132 is vertically and slideably movable between a lower collapsed position and an upward extended position relative to the base member 131 and container body.

Base member 131 may be mounted to the container 120 via mutual pairs of slideably engaged rails 140, 141. The rails are preferably formed of suitable metal (e.g. steel, aluminum, etc.) for strength to provide slideably but secure coupling of the base member 131 to the container body. In other possible embodiments, the rails may be formed of a suitably strong polymeric material.

Referring to FIGS. 11, 12, 17, and 20-22, a pair laterally spaced apart rails 141 is mounted on the bottom 121 of the container. Rails 141 may an L-shaped cross-sectional configuration forming an inwardly open gap or space 144 between a horizontal part of the rails and bottom of the container. The vertical part of the rails 141 may be fixedly attached to the container body via fasteners, rivets, or another suitable method. Rails 141 preferably may be formed of a suitable metal (e.g. steel, aluminum, etc.) and may be constructed of structural angles in one embodiment. In one embodiment, rails 141 may mounted in a downwardly open cavity 143 recesses into the bottom 121 of the container 120. The cavity minimizes the downward projection of the base member 131 when mounted to the container rails 141. Detent pins 145 may be mounted to the rear ends of rails 141 and extend vertically upwards from the horizontal part of the rails for purposes evident presented below. The pins 145 do not extend for the full height of spaces 144 between the rails and bottom of container 120.

In one embodiment, the horizontal securement portion 133 of base member 131 includes a mating pair of laterally spaced apart elongated rails 140. Rails 140 may be fixedly attached to securement portion 133 in a rigid manner, or formed integrally as a unitary structural part thereof. In one embodiment, rails 140 may be disposed on the forward end portion of securement portion 133 and terminate before the rearward end portion creating a gap therebetween (see, e.g. FIG. 20). Rails 140 in this construction have a horizontal length less than the total length of the securement portion 133 (measured in the front to rear direction). When assembling the container 120, this allows the base extension member rails 140 to inserted forwardly over the detent pins 145 into the open spaces 144 created by container rails 141. The base member 131 and its rails 140 may then be lowered once past the pins 145 to engage the upward facing surface of the container rails 141. When the handle assembly 130 is slid rearward on the rails 140, 141 to adjust the upwardly open gap G between the container rear 123 and vertical handle member 132 for engaging the bottom edge of the door 50, the detent pins 145 prevent the handle assembly from becoming completely separated from the container.

Figure 22:
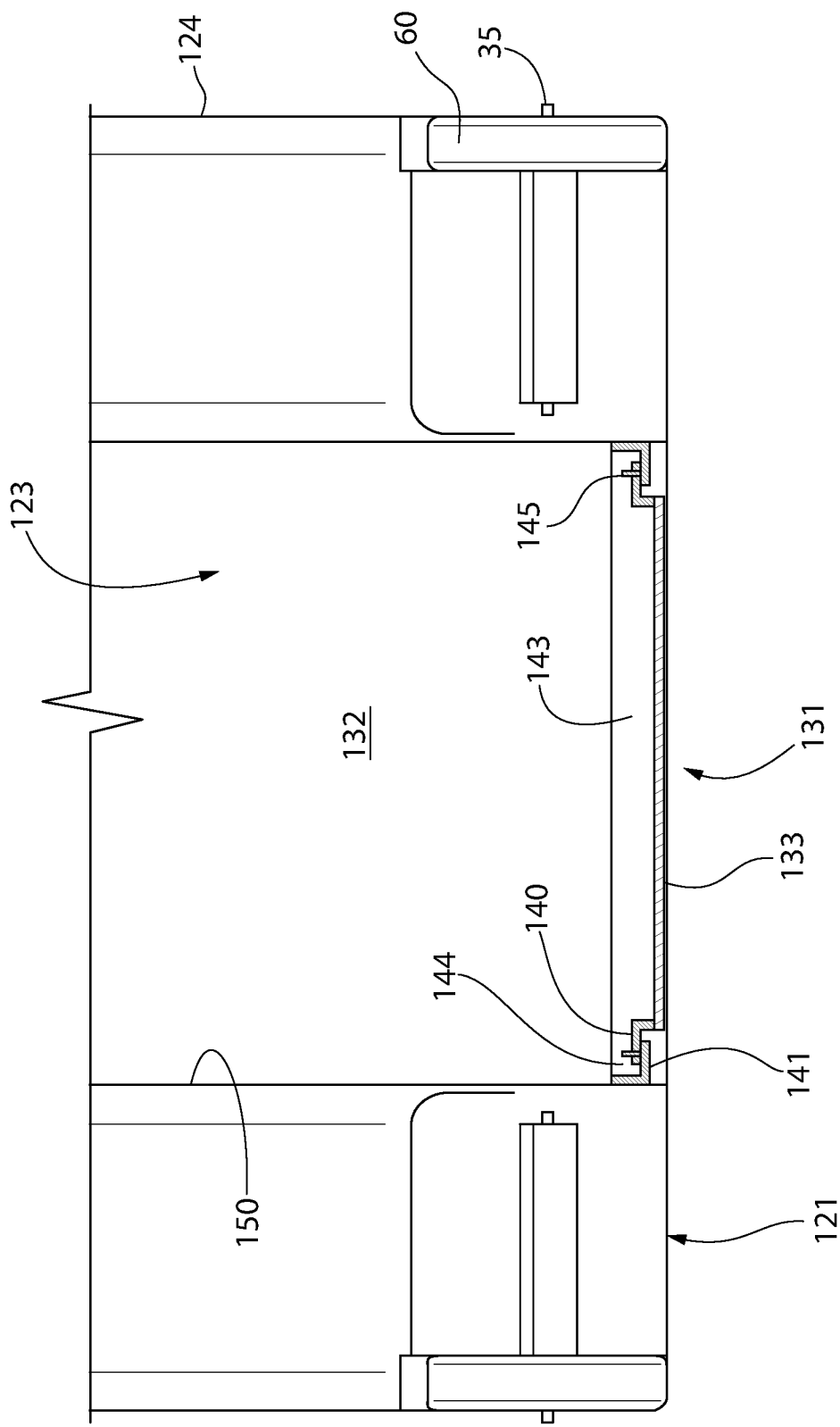
FIG. 22 is a rear view of the container showing mounting rails of the handle assembly slideably engaging rails of the container.

Base member rails 140 may have an L-shaped cross-sectional configuration and having an inverted orientation relative to container rails 141 (best shown in FIG. 22). In one embodiment, the L-shaped rails 140 may be formed by spacers 142 secured between the top surface of securement portion 133 and the top horizontal parts of rails. This elevates the laterally broadened horizontal top part of the rails above the top surface of the base member horizontal securement portion 133. Rails 140 each protrude laterally outwards from the side edges of securement portion 133 as shown for entry into spaces 144 formed by rails 141 on the container body. In other possible alternative embodiments, rails 140 may be formed by metal structural angles (e.g. steel, aluminum, etc.) similarly to rails 141 and fixedly attached to the top surface of securement portion 133 such as via welding or fasteners, or alternately may be formed by laterally open C-shaped structural channels.

Referring generally to FIGS. 10, 11, 13, 14, 16, 21, and 22, a rearwardly open channel 150 is recessed into the rear wall 123 of container 120. Channel 150 may be centered between the lateral sidewalls 124 in one embodiment. Handle assembly 130 is movable horizontally rearward out of the channel 150 to an outward position, and forward into the channel to an inward position. In the inward position, the vertical handle member 132 of handle assembly 130 is nested into the channel 150. This allows for compact storage of the handle and facilitates maneuvering the container 120 by its wheels 60 particularly when the container is tilted (similarly to FIG. 7). In the outward position, the vertical handle member 132 is spaced apart from the rear 123 of the container to create a user-adjustable gap G therebetween for receiving the lower portion of door 50 there to secure the container in place for use when receiving delivered packages. It bears noting that handle member 132 is vertically adjustable in height either when in channel 150 or out of the channel.

In one aspect, an operating mechanism is provided with several functional features disclosed herein; a first one of which is to lock the handle assembly 130 in the inward position in rear channel 150 of container 120. Referring generally to FIGS. 9-19 and 24-27, the operating mechanism in one non-limiting embodiment may be a crank mechanism 200 mounted to the vertically elongated handle member 132 of handle assembly 130. Crank mechanism 200 generally includes a pair of sliding locking bolts or pins 201 operably coupled to a rotatable operating lever 202 by a linkage 203. The majority of crank mechanism 200 including may be mounted inside the internal cavity 135 of handle member 132 as shown, except for portions of the lever assembly which of course are exposed for operation by the user.

Linkage 203 may be a slider crank linkage in one non-limiting embodiment comprising a first revolute or pin joint 208 formed on the lever 202, a second pin joint 209 formed on a reciprocatable crank slider 215 slideably mounted inside a vertically oriented through passage 218 in guide sleeve 214 fixedly mounted to handle member 132, a third pin joint 210 formed on one locking pin 201, and a fourth pin joint 211 formed on the remaining locking pin 201. The locking pins 201 are disposed on opposite lateral sides of vertical handle member 132 as shown and slideably mounted in a respective guide boss 212 disposed inside cavity 135 of handle member 132. Each locking pin 201 is horizontally oriented and slideable laterally through a respective circular bore in mounting bosses 212 as shown (see, e.g. FIG. 27). The bosses 212 slideably support the pins. Pins 201 each have a first inner end at pin joints 210, 211 and an opposite free outer end projectible laterally outwards from mounting bosses 212 and lateral sides of the vertical handle member 132. Pins 201 may have generally elongated cylindrical bodies as shown with the inner ends being flattened to form round holes for receiving a pivot pin used at pin joints 210, 211 as shown. A majority of the length of the pins however may be cylindrical. In other possible embodiments, the pins may be formed of elongated flat straps or plates.

Linkage 203 has a generally cruciform configuration in one embodiment including a first link arm 204 and second link arm 207 which are substantially vertically oriented, and a third link arm 205 and fourth link arm 206 which are substantially horizontally or laterally oriented. In this context, the term "substantially" connotes that foregoing link arms are not perfectly oriented vertically or horizontally in all operating positions as seen in the figures, but generally may be considered to have the prescribed orientations for convenience of reference in describing the relative orientations of the link arms.

Lever 202 is operably coupled to slider 215 via link arm 204 pivotably coupled between pin joints 208 and 209. One lock pin 201 (e.g. "right" pin when viewed looking forward from rear wall 123—where the user would usually stand when adjusting the height of the handle assembly) is operably coupled to the slider 215 via link arm 205 pivotably coupled between pin joints 211 and 209. The remaining "left" lock pin is operably coupled to the slider 215 via link arm 206 pivotably coupled between pin joints 210 and 209. The purpose of link arm 207 is described later herein, but is operated by lever 202 as is apparent. In one embodiment, the link arms may be formed of flat metal straps (e.g. steel or aluminum) having a rectilinear transverse cross section to fit easily inside cavity 135 of handle member 132 which allows the thickness (front to rear) of the handle member to be minimized providing a compact handle assembly construction. In other embodiments if more resistance to bending of the link arms is necessary, the link arms may be formed of cylindrical rods. Either construction may be used.

The slider assembly of crank mechanism 200 converts rotary motion of the operating lever 202 into linear motion of the slider 215, which in turn moves the locking pins between laterally projected and retracted positions To accomplish this, lever 202 includes an operating shaft 220 fixedly mounted to a cam or lobe shaped rotary crank arm 216 pivotably mounted to vertical handle member 132 by pivot pin 217 inside handle cavity 135. Pin 217 defines an axis of rotation of the lever. The lever assembly may further include exposed front and rear face members 221, 222 mounted on the outside of vertical handle member 132 (see, e.g. FIGS. 18 and 19). The face members help secure the lever assembly to handle member 132.

In operation, rotating the lever handle 202 in opposing directions rotates the crank arm 216 to selectively project or retract the locking pins 201. For example, rotating the lever 202 in a first direction to a locked rotational position moves the slider 215 downwards in the guide sleeve 214 to project the locking pins 201 outwards to engage the container locking holes 213-1. The handle assembly 130 cannot be raised in this instance and is secured in place to the container 120. This is useful for securing the handle assembly in position on container 120 and for wheeling the container to a desired location. Rotating the lever in an opposite the second direction to an unlocked rotational position moves the slider upwards in the guide sleeve to retract the locking pins to disengage the locking holes, thereby allowing the handle assembly 130 to be raised. In one arrangement, rotating the lever 202 about 90 degrees moves the locking pins between the projected and retracted positions.

In one embodiment, the lever 202 may be mounted adjacent to a top portion of the vertical handle member 132 in its internal cavity 135 such that the top terminal operating end of the lever 202 is externally accessible to a user for rotating the lever. The exposed operating end of lever 202 may be located beneath the handle 137-1 inside the closed loop formed by the handle in one embodiment. Other suitable arrangements of the lever 202 may be used in other embodiments.

With continuing reference to FIGS. 10, 11, 13, 14, 16, 21, and 22, locking pins 201 are selectively engageable with the container rear wall 123 for locking the handle assembly 130 in the rear channel 150 of the container 120. To accomplish this functionality, the rear wall 123 may include at least one pair of locking holes 213-1 formed in container body which face inwards into the channel 150 at each side. The locking holes 213-1 are arranged to receive the locking pins 201 when in the projected position when the vertical handle member 132 of handle assembly 130 is in the lower collapsed position (see, e.g. FIG. 23). This provides the dual functionality of both locking the handle assembly 130 into the rear channel 150 and locking the handle assembly in the lower collapsed position. With locking holes 213-1 concentrically aligned with locking pins 201, rotating the lever 202 in a first direction positively engages the pins in the holes.

Figure 24:
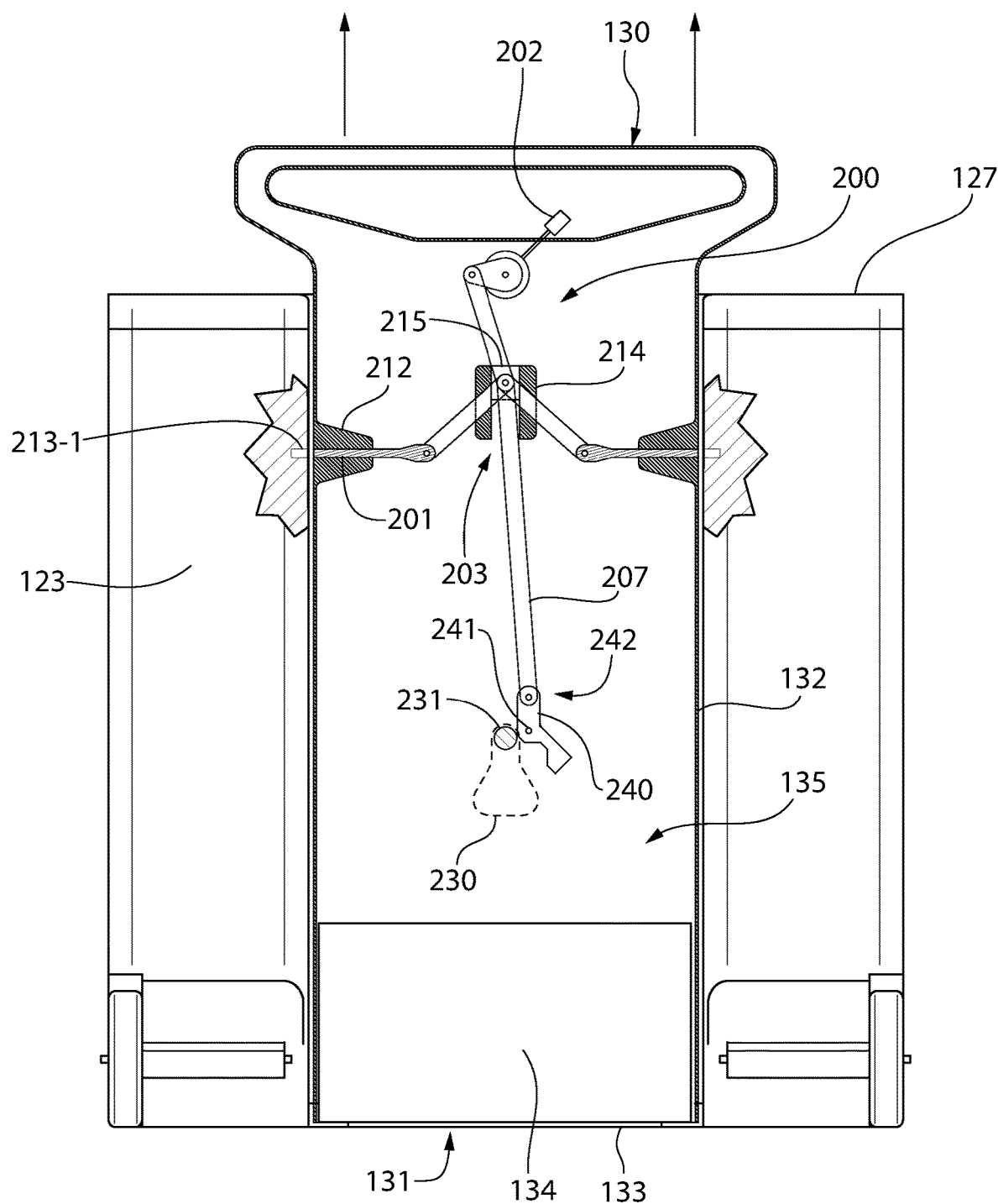
FIG. 24 is a rear view thereof showing the handle assembly in the lower collapsed position and unlocked from the container for operation.
Figure 27:
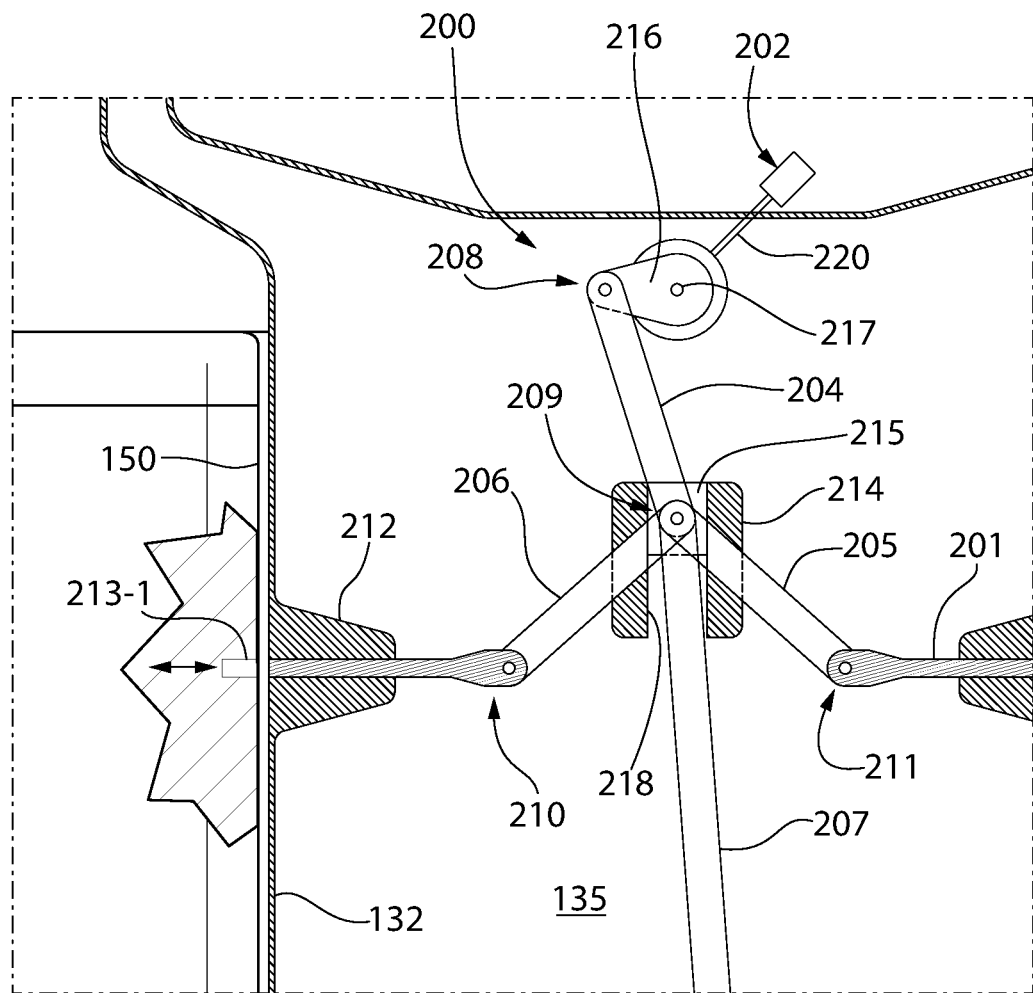
FIG. 27 is a enlarged view of the slider crank linkage of the crank mechanism taken from FIG. 24.

In order to raise the vertical handle member 132 to the upper extended position and/or remove the handle member 132 from the rear channel 150 for forming gap G to secure the container 120 beneath the door 50, rotating the lever 202 in a second opposite direction disengages the locking pins 201 from locking holes 213-1 and moves the pins to the retracted position (see, e.g. FIGS. 24 and 27). In some embodiments, a second pair of locking holes 213-2 may be provided spaced above the first locking holes 213-1. The second locking holes allow the vertical handle member 132 to be locked in the upper extended position. This serves two purposes. First, the handle assembly may be locked in the higher position for convenience of taller users when rolling the container 120 into place. Second, the locked higher position of the handle assembly lever 202 in the locked rotational position cooperates with the wall pin mounting feature of container 120 as further described herein.

FIGS. 23-26 show sequential views in a method of locking/unlocking the handle assembly 130 from container 120, and raising the handle assembly to various vertical positions while the base member 131 of the handle assembly is still slideably coupled to the container body using the handle crank mechanism described above. The method may be summarized as follows.

Figure 13:
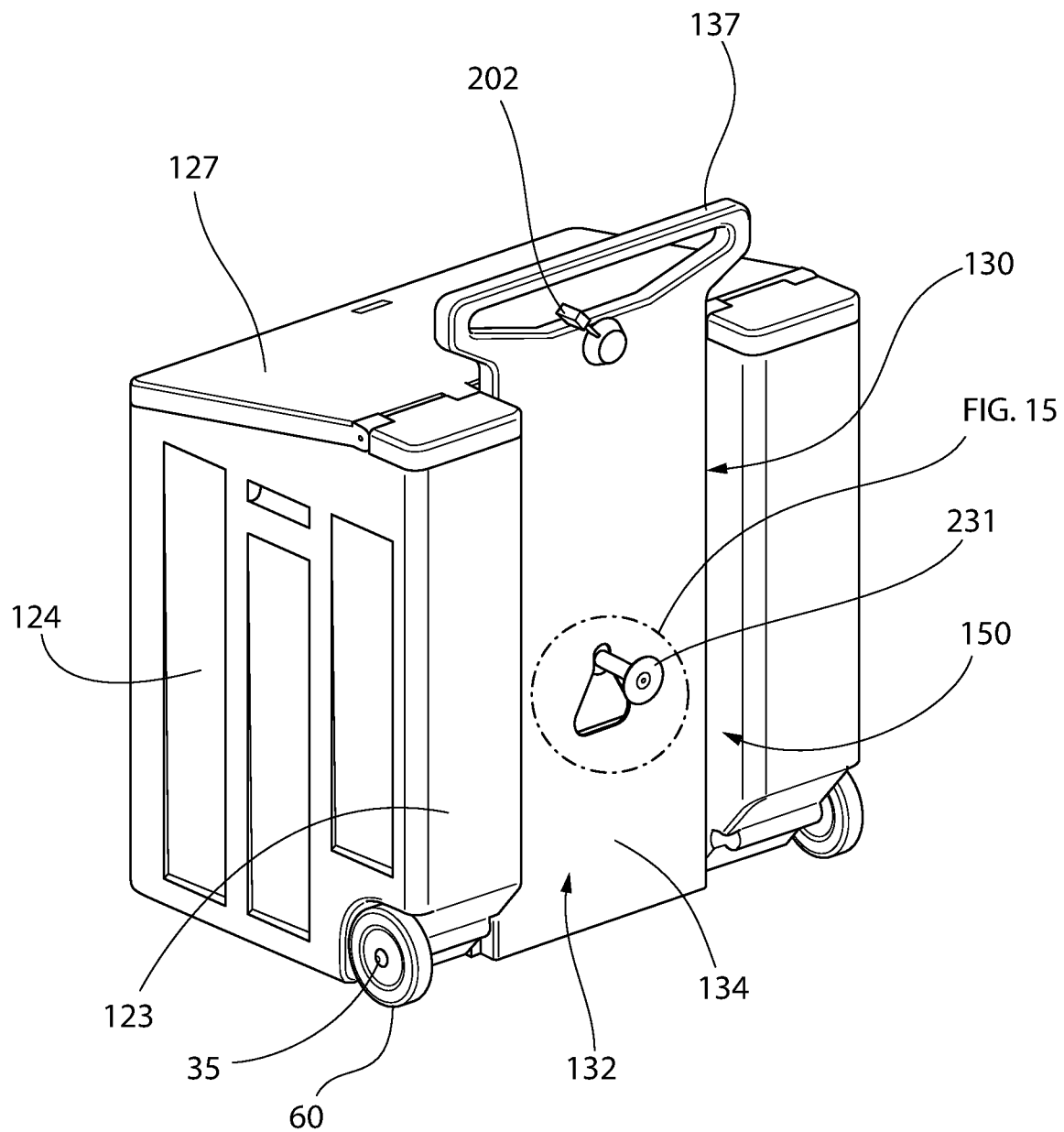
FIG. 13 is rear perspective view of the container with handle assembly in a lower collapsed position engaged with the rear of the container in an inward position.
Figure 14:
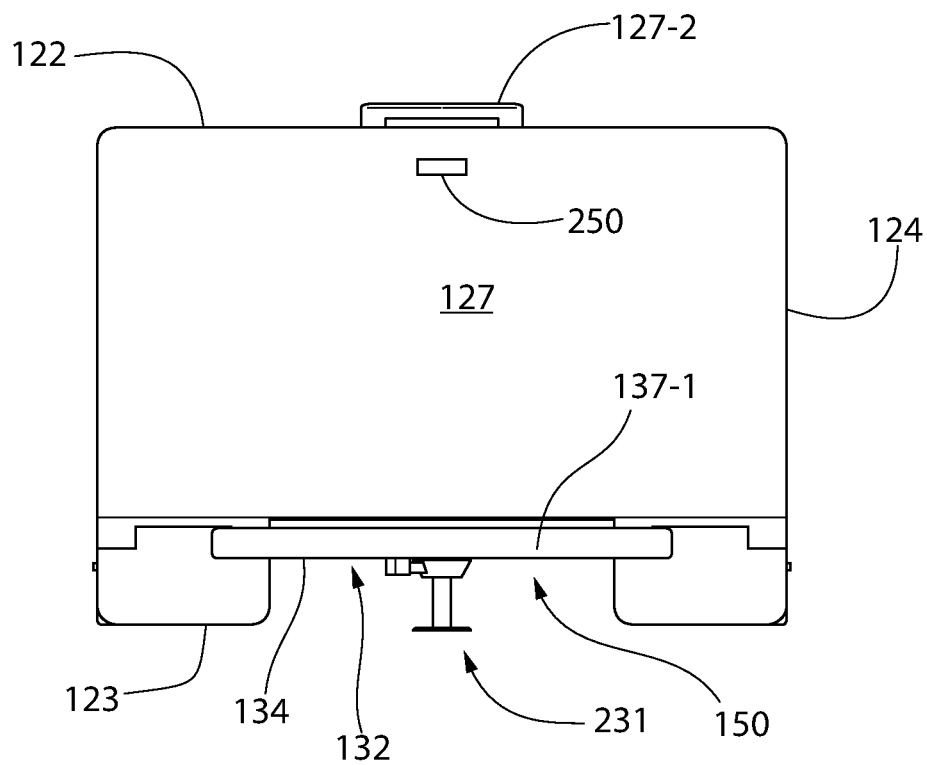
FIG. 14 is top view thereof.
Figure 15:
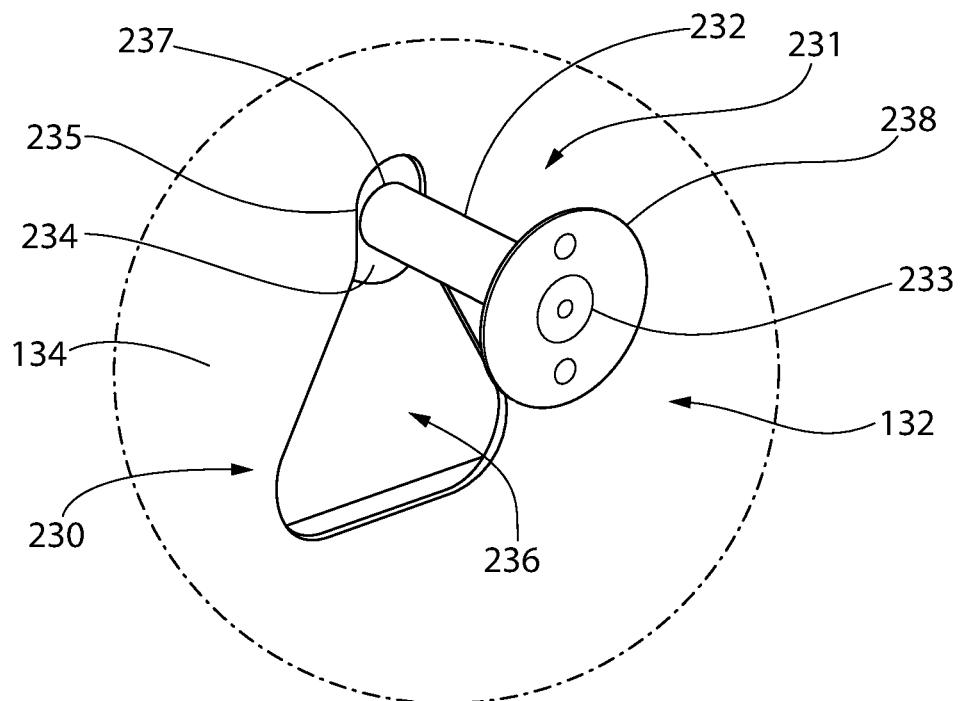
FIG. 15 is a detailed view taken from FIG. 13 of a wall mounting system.
Figure 16:
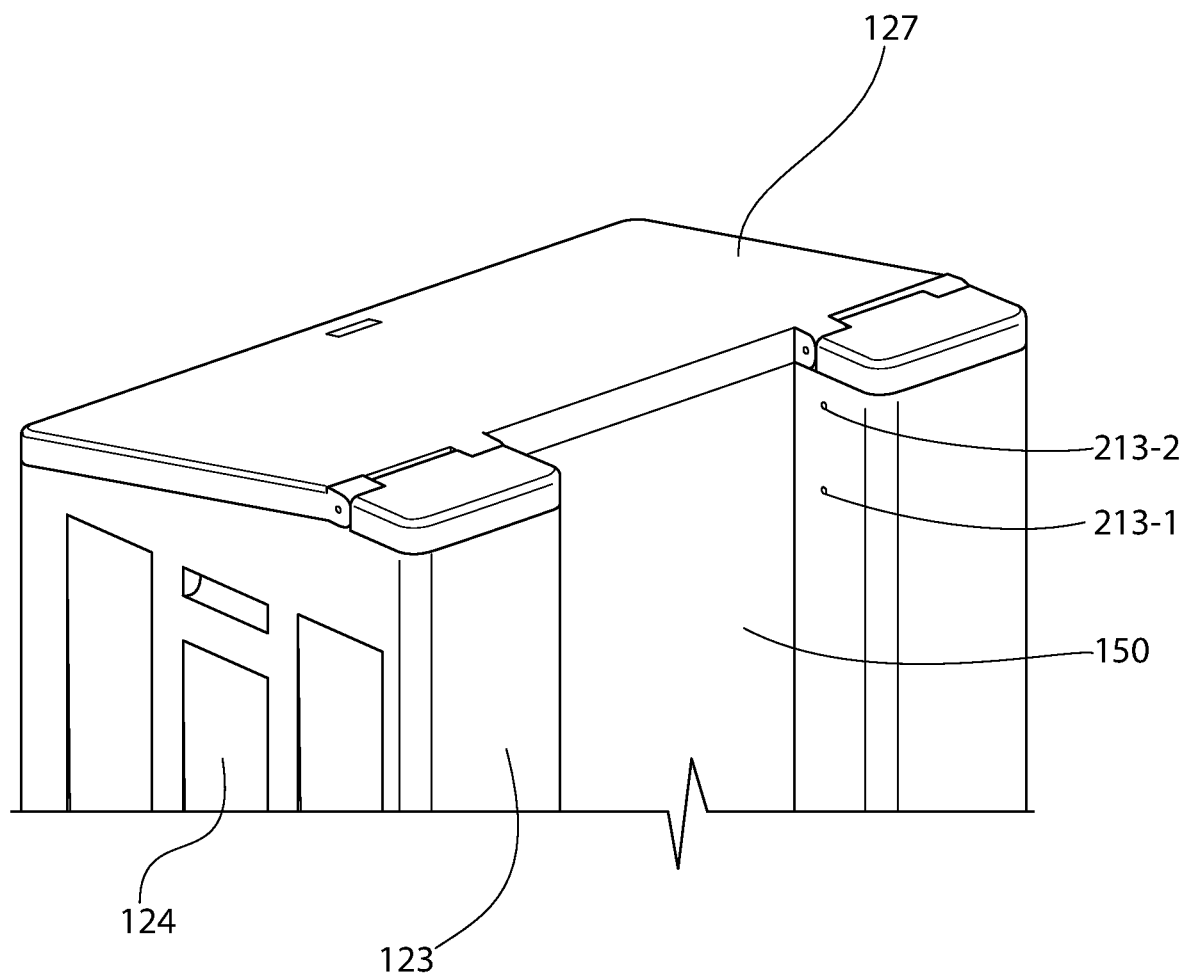
FIG. 16 is a top rear perspective view of the container with handle assembly optionally completely removed for use as a dolly.
Figure 23:
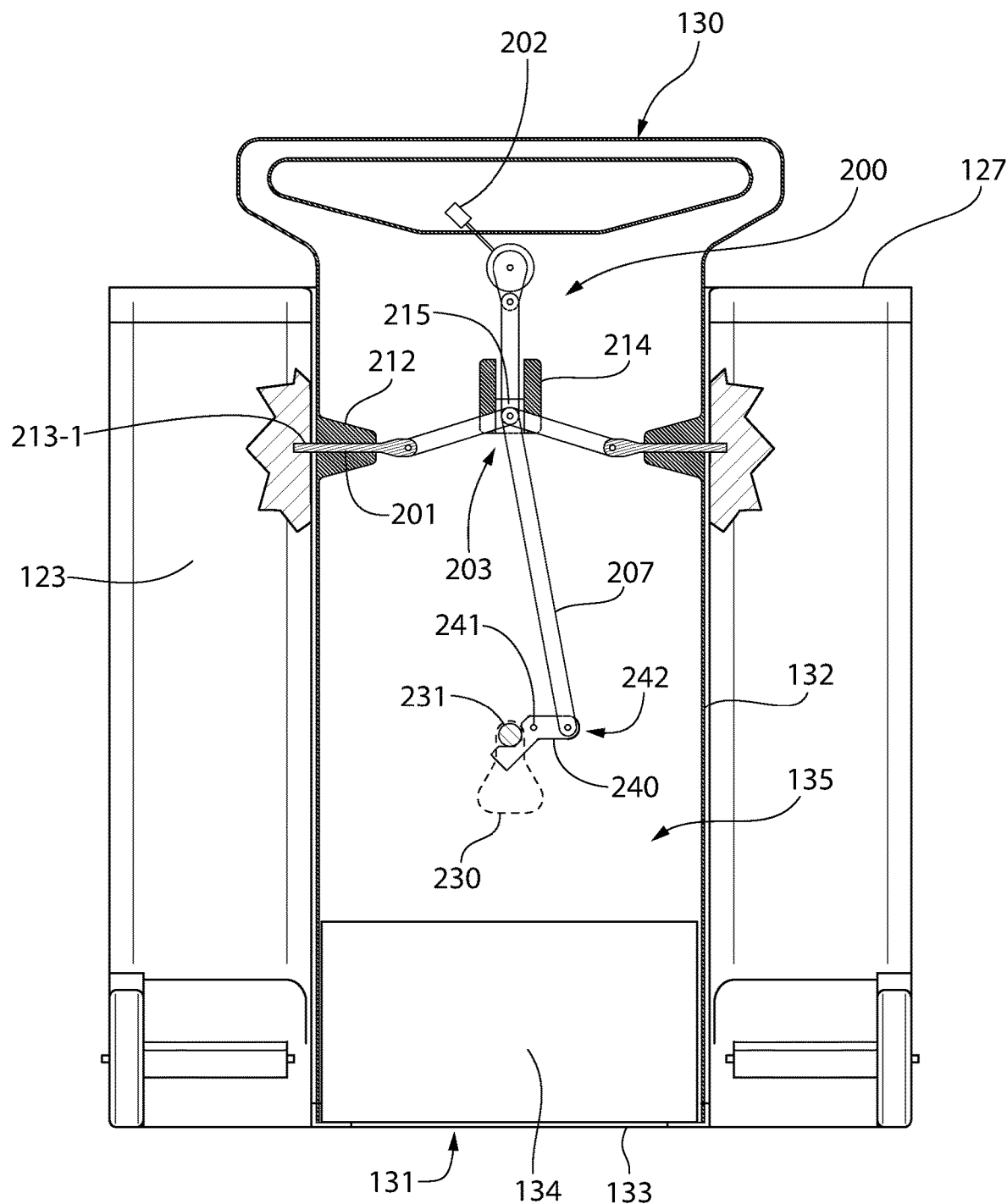
FIG. 23 is rear view showing of the container and cross-sectional view of handle assembly in a lower collapsed position locked to the container via a crank mechanism with locking pins.

To initially form a locked relationship between handle assembly 130 and container 120, the handle assembly 130 in its lower collapsed position is first moved from its outward position horizontally displaced rearward from the rear wall 123 of container 120 (see, e.g. FIG. 29) to the inward position nested in rear channel 150 of the container (see, e.g. FIG. 13). The handle assembly cannot be locked to container 120 unless positioned in channel 150 in the illustrated embodiment. Once in the channel, the operating lever 202 is rotated to its locked rotational position which moves the slider 215 downwards in the guide sleeve 214 to project the locking pins 201 outwards to engage the container locking holes 213-1. This position is shown in FIG. 23. This stowed position of the handle assembly 130 may be used for compact storage of container, wheeling the container across a surface to a desired location, or in conjunction with an optional wall mounting system described below.

Figure 25:
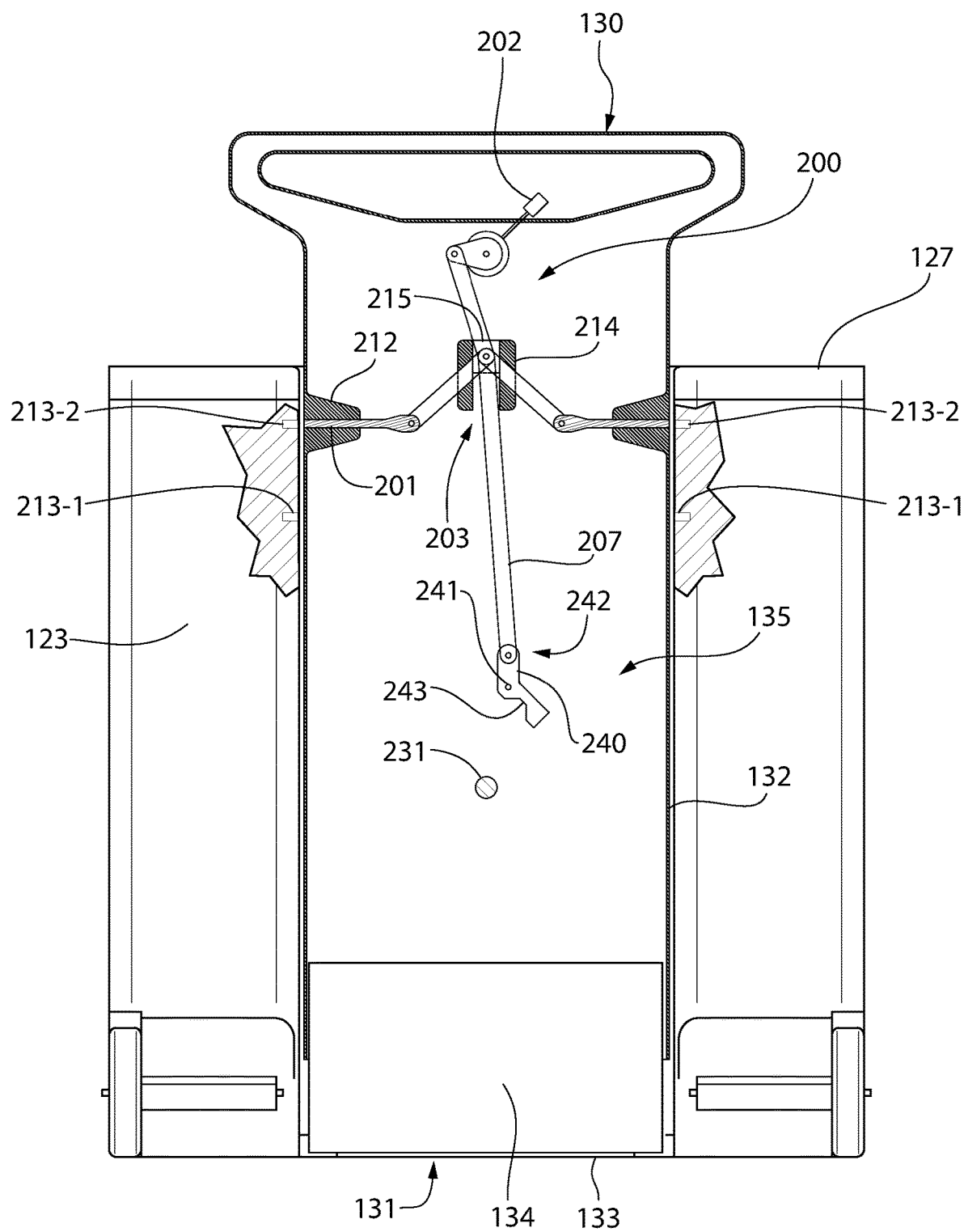
FIG. 25 is a rear view showing the handle assembly raised to a first upper extended position.
Figure 26:
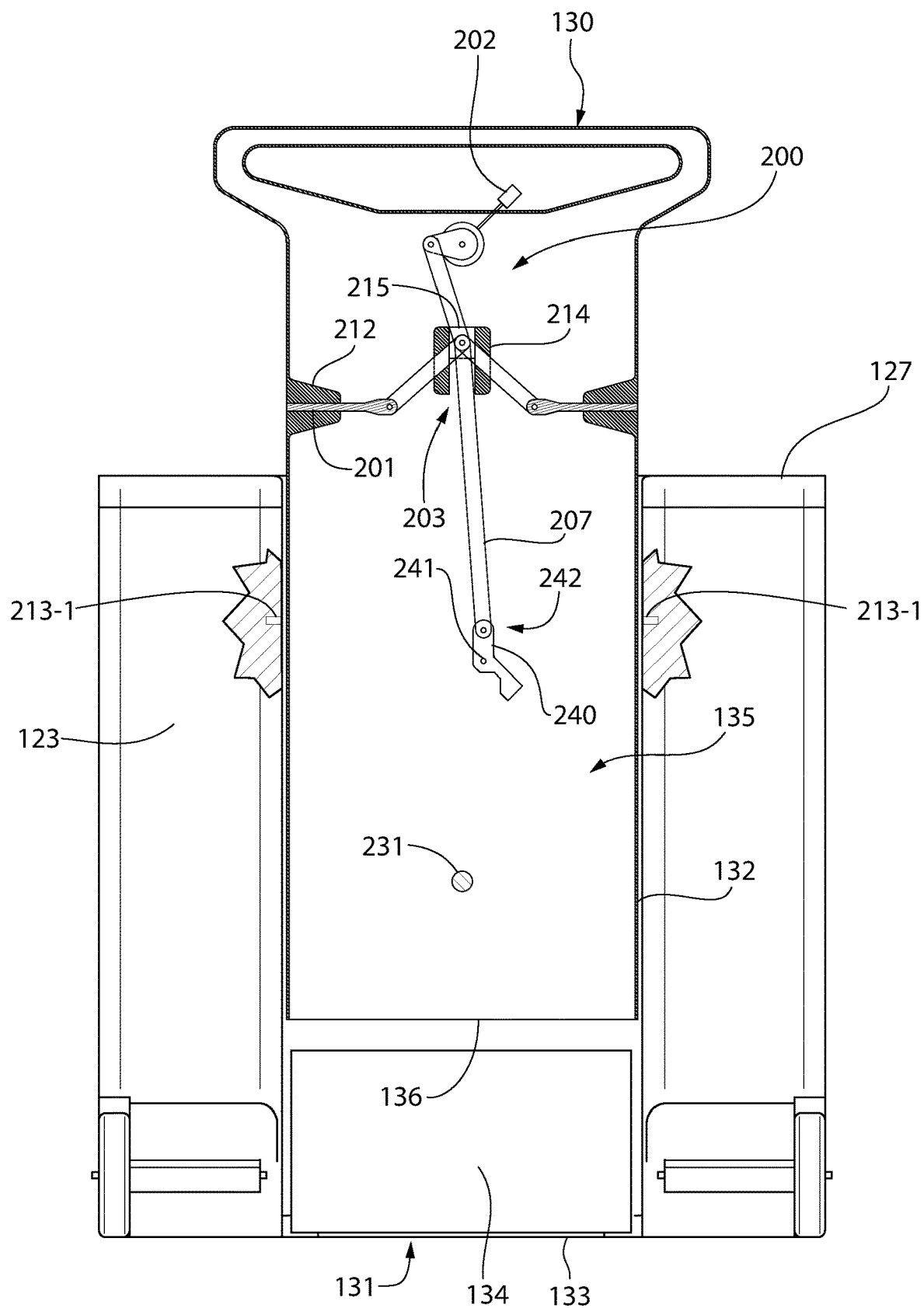
FIG. 26 is a rear view thereof showing the handle assembly raised to a second upper extended position.

To permit raising the handle, operating lever 202 is rotate to its unlocked rotational position which moves the slider 215 upwards in the guide sleeve 214 to retract and disengage the locking pins 201 to the locking holes 213-1, thereby unlocking and allowing the handle assembly 130 to be raised (see, e.g. FIG. 23). Handle assembly 130 can now be raised to the upper position shown in FIG. 25. In this position, locking pins 201 may be laterally and concentrically aligned with the optional second pair of upper container locking holes 213-2 in rear channel to secure the handle in this raised position. In some embodiments, the handle assembly 130 can still be further raised to a higher position to uncouple vertical handle member 132 from base member 131. Bottom edge 136 of vertical handle member 132 separates from vertical mounting portion 134 of the base member. The vertical handle member 132 may optionally be completed dismounted from vertical mounting portion 134 of base member 131 if desired as shown in FIG. 26.

Figure 10:
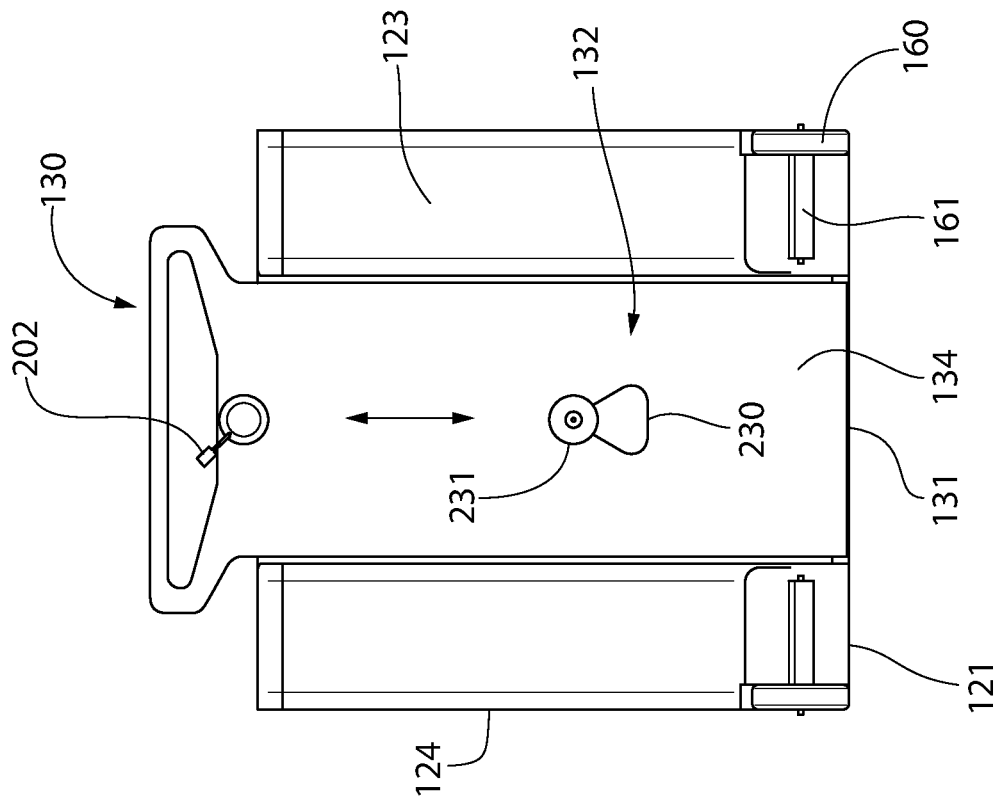
FIG. 10 is a rear view thereof.
Figure 9:
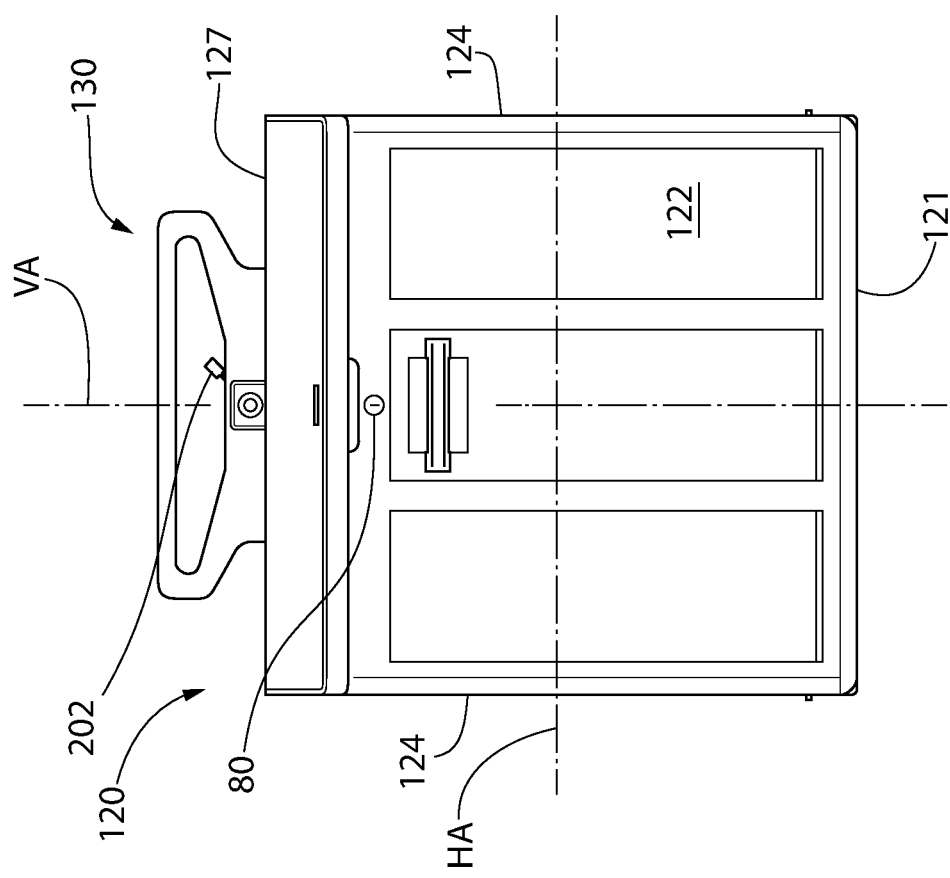
FIG. 9 is a front view of a secure delivered package container constructed in accordance with a second embodiment of the present invention.
Figure 11:
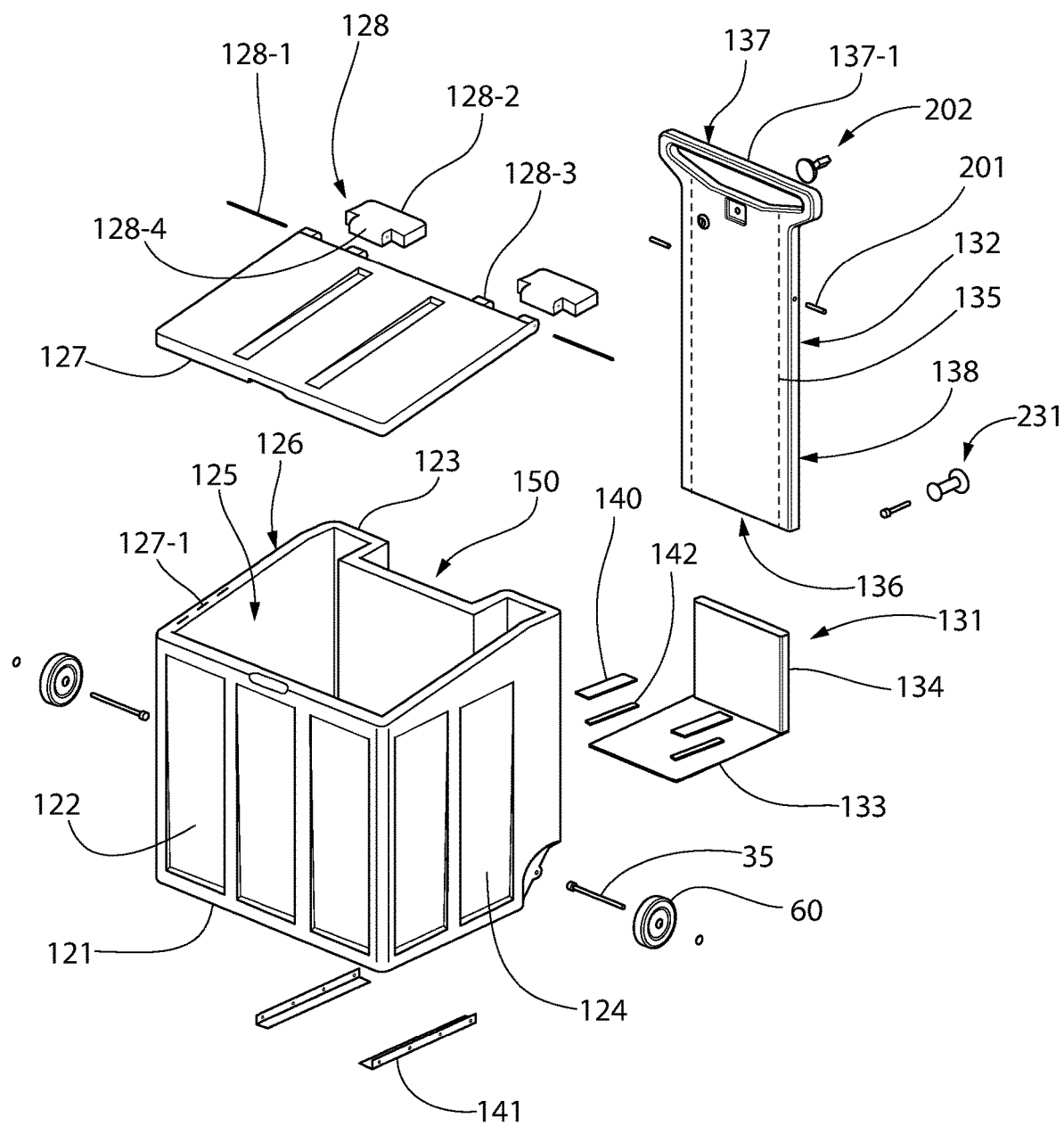
FIG. 11 is an exploded perspective view thereof.

A related method for securing the container 120 to a vertically movable door 50 using the crank mechanism may start with the handle assembly 130 positioned inside rear channel 150 of the container in its inward position and in the lower collapsed position locked in place via engagement between locking pins 201 and holes 213-1 (see, e.g. FIGS. 10, 13, and 23). Operating lever 202 is in its locked rotational position (i.e. pins 201 in holes 213-1). There is no appreciable gap G between the vertical handle member 132 and rear wall 123 of the container sufficient to insert door 50 therein at this stage.

To open gap G, the lever 202 is next rotated to its opposite unlocked rotational position to disengage locking pins 201 from the locking holes 213-1. Handle assembly 130 is next horizontally moved rearward (parallel to horizontal centerline axis HA) and separated from the container 120 by pulling the handle assembly away from the container. During this motion, handle rails 140 of handle base member 131 slide rearward along corresponding engaged container rails 141 (see, e.g. FIGS. 20-22). This opens gap G, which can be horizontally adjusted by the user to allow the bottom portion and edge of the door 50 to enter the gap when lowered and engage the top of securement horizontal portion 133 of the handle base member 131 (see, e.g. FIG. 29). The securement portion 133 of handle assembly 130 is trapped beneath the door 50 to lock the container in place. Preferably, gap G is adjusted so that the rear wall 123 of container 120 is in close proximity to the exterior surface of door 50, which precludes ready access to any partially exposed parts of the base member 131 that might be severed with power tools to steal the container. Because the vertical handle member 132 of handle assembly 130 preferably has a height which extends for a least a majority of the height of the container, and in some embodiments may be at least as high as the container or more, there is little possibility of a would-be thief dislodging or separating the container from the door. The container 120 is now fully secured to door 50 and ready to receive package deliveries.

The foregoing components of the crank mechanism including the lever assembly and slider crank linkage parts, and lock pins may preferably be made of suitable metal for strength such as steel, aluminum, etc. In other embodiments, suitably rigid and strong polymers may be used for certain parts.

According to another aspect of the invention, container 120 further includes a wall mounting system. This allows securing the container to an available exterior wall 51 of a building instead of utilizing the door 50 (see, e.g. FIG. 28). In some instances, the building may not have a vertically openable/closeable door such as a garage door, or the user may simply prefer the wall mounting option.

Referring generally to FIGS. 10-11, 13-15, and 23-27, the wall mounting system generally includes a wall pin 231 configured for attachment to exterior wall 51 and a securement aperture 230 formed in the handle assembly 130. In one embodiment, aperture 230 is formed in the vertical handle member 132 of the handle assembly and rearwardly open to receive the wall pin 231. Wall pin 231 in one embodiment may comprise an elongated cylindrical shaft 232 including a mounting end 233 configured for attachment to the wall 51 and an opposite locking end 237 configured for securement to the container 120 in securement aperture 230. Mounting end 233 may be terminated with a diametrically enlarged mounting flange 238 including mounting holes for affixing the flange to wall 51 via fasteners (not shown). Locking end 237 may be terminated with a diametrically enlarged locking flange 234.

Securement aperture 230 includes an enlarged entrance portion 236 defining defines an opening larger than locking flange 234 of wall pin 231 for initially inserting the wall pin through the aperture into internal cavity 135 of vertical handle member 132. Aperture 230 further includes an adjoining narrower locking portion 235 formed contiguously and communicating with the entrance portion 236. Locking portion 235 defines an opening smaller than the locking flange 234 of the wall pin for preventing removal of the container from the pin when mounted. In one embodiment, the locking portion 235 may be a vertically elongated slot in configuration. The entrance portion 236 may be generally triangular shaped as shown, or circular in other possible embodiments having a larger diameter than the wall pin locking flange 234. In one arrangement, entrance portion 236 of aperture 230 is below locking portion 235 to lock the handle assembly 130 to wall pin 231 when the handle assembly is in the lower collapsed position.

In operation, a method for using the container wall mounting system and securing container 120 to an exterior wall 51 includes first fastening the wall pin 231 securely to exterior wall 51. Threaded fasteners may be used for this purpose. The mounting height of wall pin 231 selected should ensure that the pin is horizontally aligned with the locking portion 235 of securement aperture 230. Because in one embodiment the locking portion is a vertical slot, the wall pin need only be positioned somewhere in the slot so that the enlarged locking flange 234 of the pin can be trapped behind the slot. Next, the lock pins 201 are retracted into the vertical handle member 132 via operating the lever 202. The handle assembly 130 (i.e. vertical handle member 132) is then raised to the upper extended position parallel to vertical centerline axis VA of container 120 to horizontally align the wall pin locking flange 234 with the enlarged entrance portion 236 of securement aperture 230. The upper locking holes 213-1 and locking pins 201 may optionally be used to temporarily maintain this upper position of the handle assembly via operating lever 202 to engage the pins in the holes. The locking end 235 of wall pin and flange 234 are then inserted through the enlarged entrance portion 236 into internal cavity 135 of handle member 132. With the end of wall pin 231 and locking flange 234 positioned through securement aperture 230, the handle member 132 is lowered to the lower collapsed position. The handle member 132 may first be unlocked via operating the lever 202 if optionally locked in the upper position before. As handle member 132 is lowered, wall pin 231 moves from the enlarged entrance portion 26 of securement aperture 230 into the narrower locking portion 235, thereby trapping the wall pin locking flange 234 in the securement aperture (see, e.g. FIGS. 10, 13, and 15). To secure the container 120 in place on wall pin 231, the handle member 132 is locked in rear channel 150 to the container by rotating the lever 202 to engage the locking pins 201 with the lower pair of locking holes 213-1. The container 120 is now mounted on the wall pin 231 as shown in FIG. 28.

Although container 120 is mounted now to exterior wall 51, it will be apparent that a would-be thief could simply lift the entire container 120 upwards to disengage the wall pin 231 from securement aperture 230 and carry the container away. Because the handle assembly 130 and operating lever 202 are exposed on the outside of exterior wall 51 (see, e.g. FIG. 28), the thief could alternatively access and rotate operating lever 202 to unlock the handle assembly 130 and raise it to disengage wall pin 231 if no further securement measures are provided.

Figure 17:
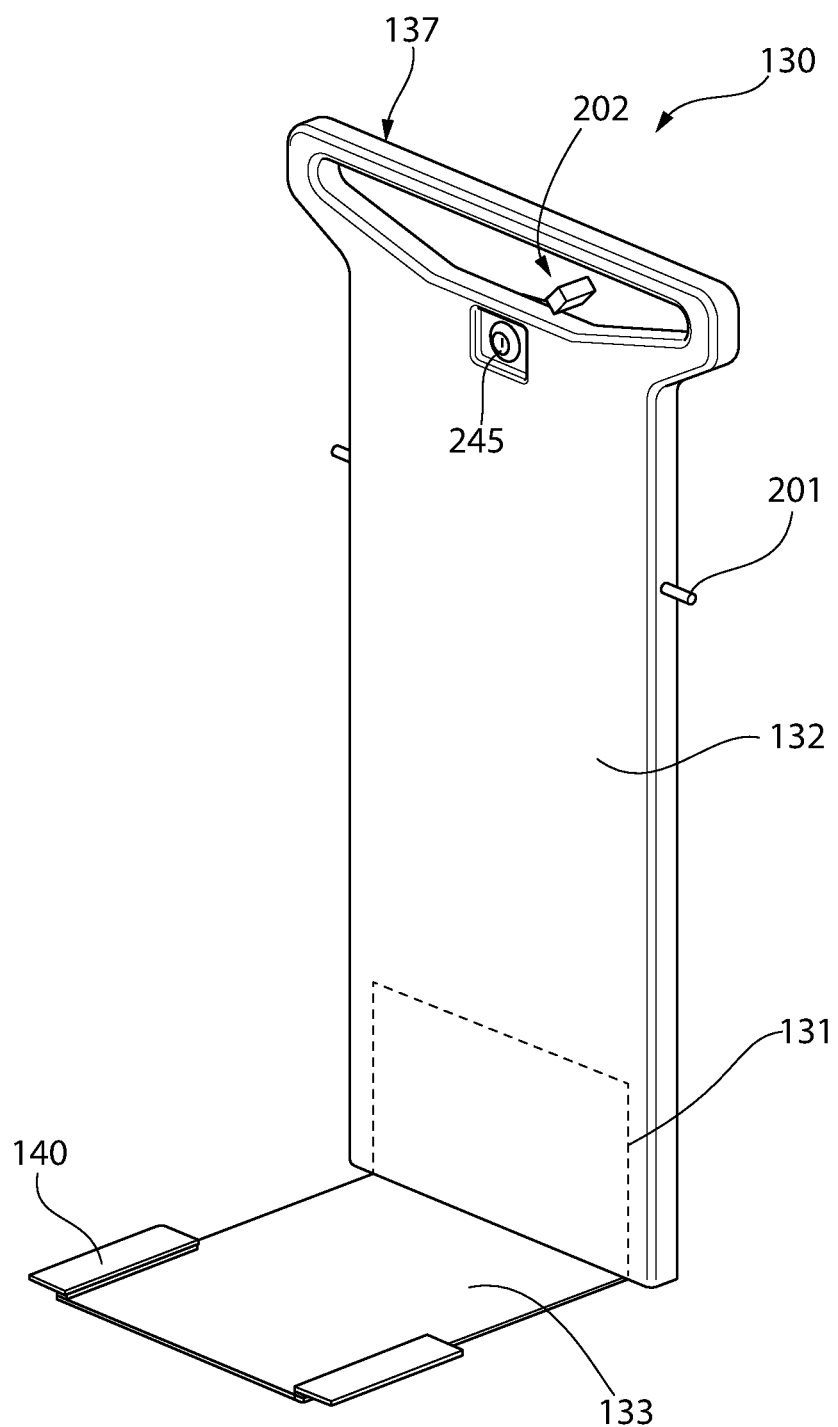
FIG. 17 is a front perspective view of the handle assembly in isolation.
Figure 18:
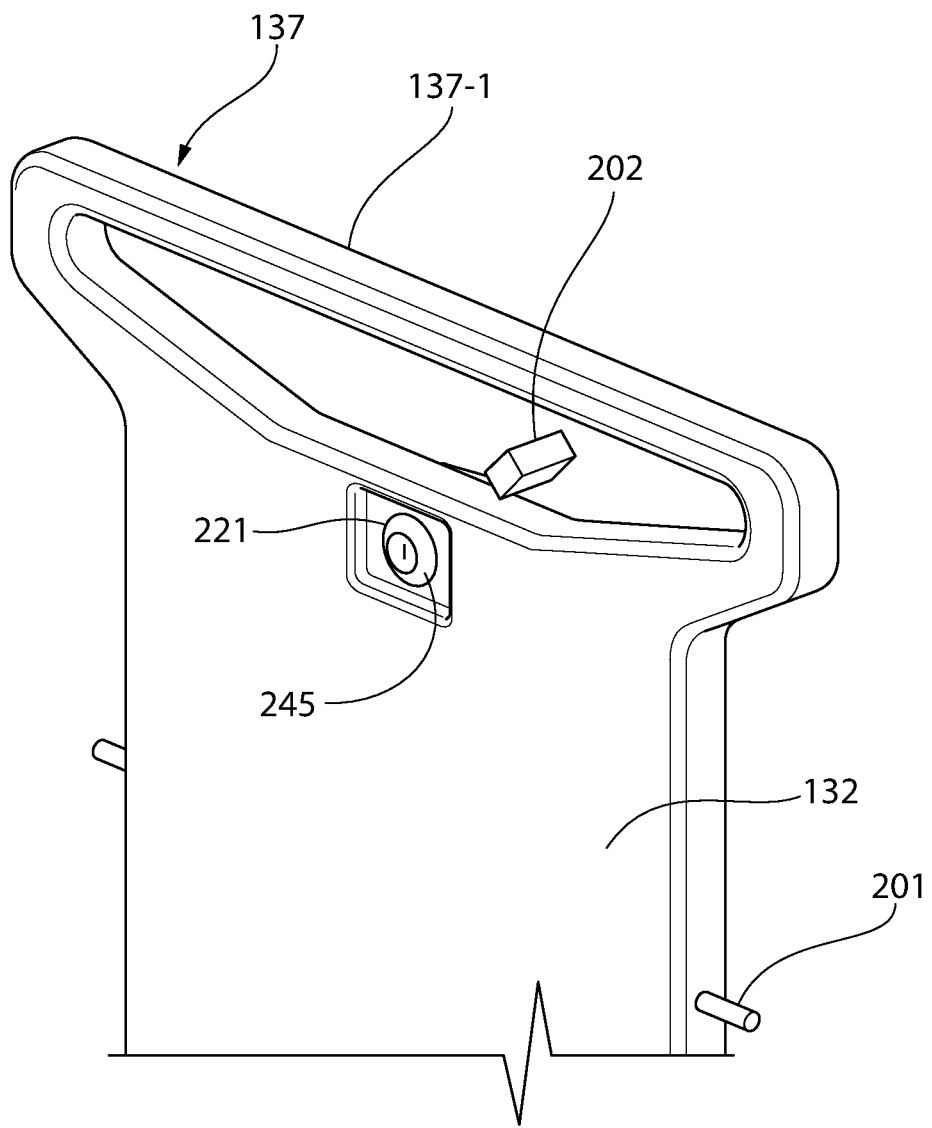
FIG. 18 is a front perspective view of a top portion of the handle assembly.
Figure 19:
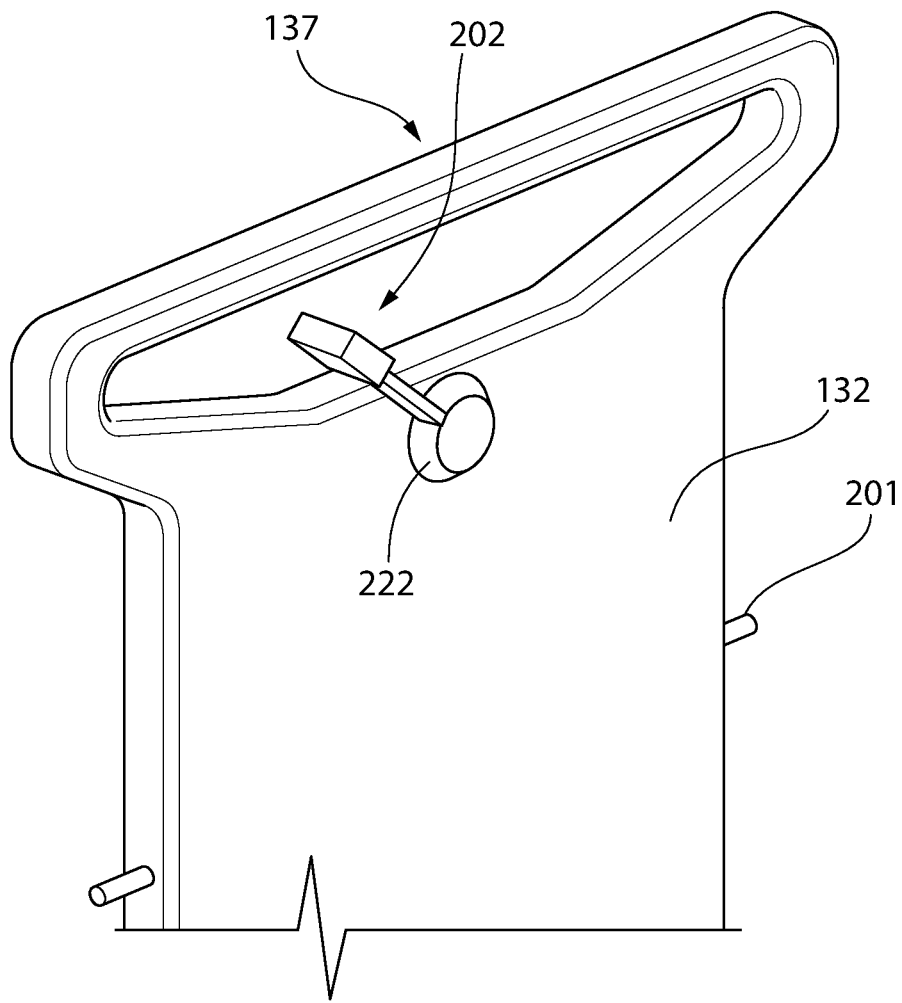
FIG. 19 is a rear perspective view thereof.
Figure 20:
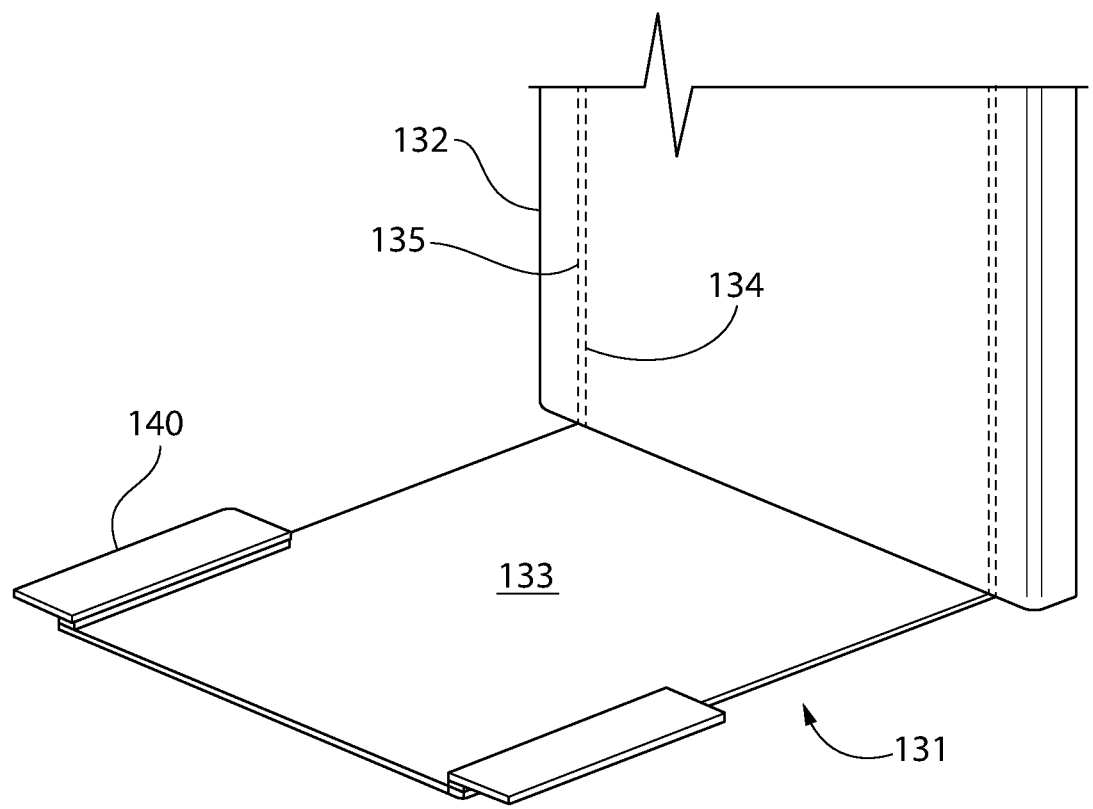
FIG. 20 is a perspective view of the bottom portion of the handle assembly showing a base member which slideably couples the handle assembly to the container.
Figure 21:
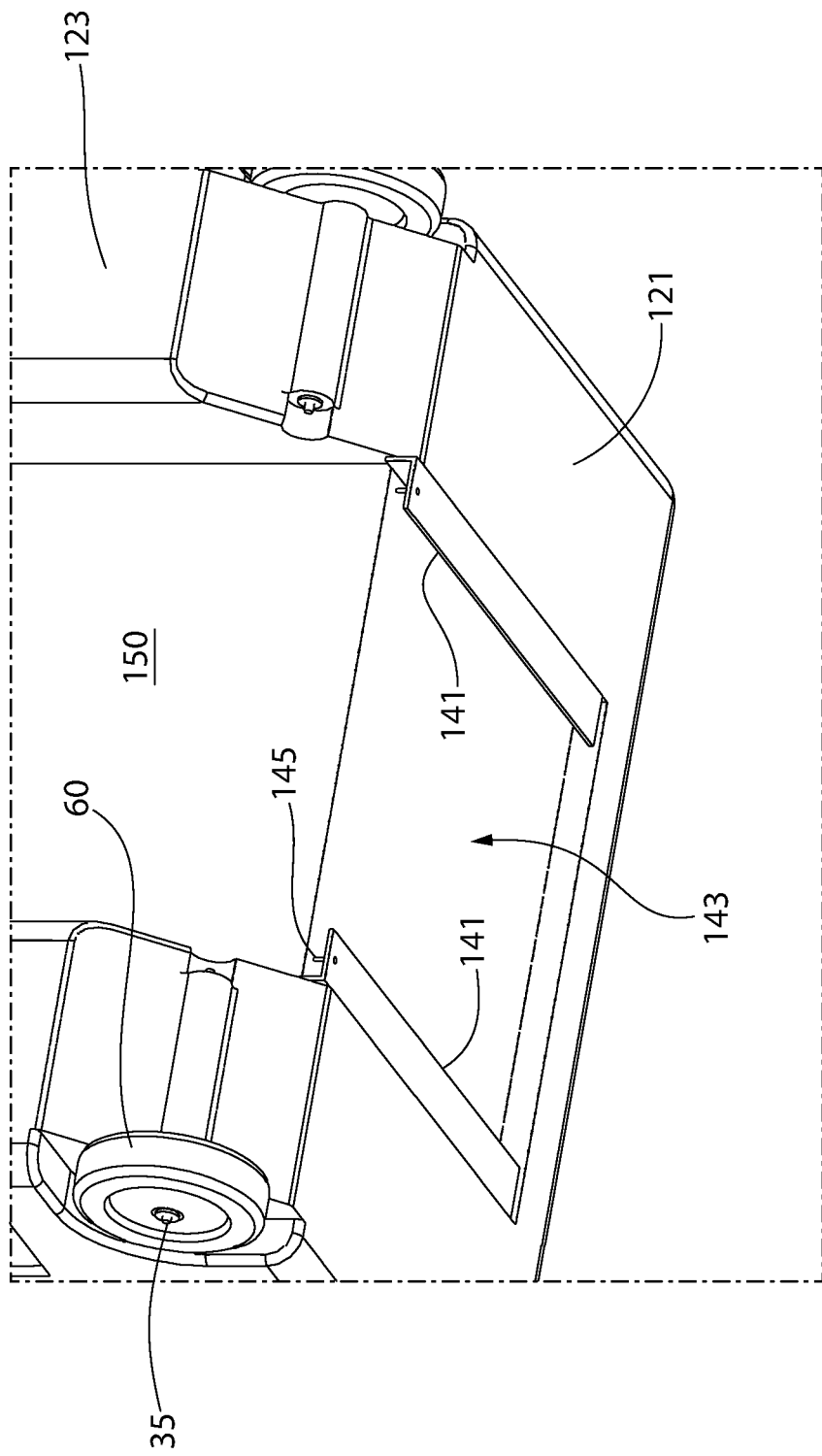
FIG. 21 is bottom rear perspective view of the container showing a details for slideably coupling the handle assembly to the container.

Two additional securement feature are disclosed which cooperate to positively lock the container to wall pin 231 in a tamper-resistant manner and avoid each of the foregoing theft scenarios. First, the operating lever assembly includes a lock 245 which is configured and operable to lock the lever 202 in the locked rotational position with handle locking pins 201 engaged in lower locking holes 213-1. This prevents a would-be thief from moving the lever 202 and raising the handle assembly 130 once locked in position via the interlocked pins and holes, thereby advantageously avoid the latter of the two foregoing theft scenarios. Any suitable manual or electronic locking mechanism may be used. In one non-limiting embodiment, as shown in FIGS. 17 and 18, a simple manual key lock may be provided. An electronic lock operated via a fob or similar means may be used instead. It also bears noting that lock 245 may further be configured to lock operating lever 202 in its unlocked rotational position with locking pins 201 disengaged from locking holes 213-1 (or holes 213-2 if the handle is in its upper extended position).

To avoid the former of the two foregoing theft scenarios and prevent raising the entire container 120 to disengage wall pin 231, a latch mechanism is provided. Referring to FIGS. 23-27, the latch mechanism includes a hooked latch 240 pivotably mounted inside internal cavity 135 of vertical handle member 132 about pivot pin 241. Pivot pin 241 is fixed in position to handle member 132 and defines a pivot axis for latch 240. Latch 240 may be formed by a angled plate in one embodiment having an elongated and bent or angled body as shown. Pivot pin 241 is disposed between a hooked end of latch 240 configured to selectively engage the shaft 232 of wall pin 231 inside the handle member, and an opposite connection end configured to define another fifth pin joint 242 of the slider linkage assembly. Link arm 207 is operably coupled between pin joint 242 and pin joint 209 on slider 215. The hooked end of latch 240 may define an outwardly open recess 243 (numbered in. FIG. 25) which receives wall pin shaft 232 to engage the pin with the latch (see, e.g. FIG. 23).

Rotating operating lever 202 in opposing rotational directions operates the slider crank linkage and selectively moves latch 240 about its pivot axis between a latched position engaged with wall pin 231 (see, e.g. FIG. 23) and an unlatch position (see, e.g. FIGS. 24-26). In the latched position, latch 240 engages and traps the wall pin 231 in the narrower locking portion 235 of securement aperture 230. When lever 202 is locked in its locked rotational position (i.e. locking pins 201 engaged with handle locking holes 213-1), the latch 240 may be concomitantly locked in the latched position to prevent raising the vertical handle member 132 for disengaging the handle from wall pin 231 and stealing the container 120. When the latch 240 is in the unlatched position, the handle member 132 may raised.

The foregoing method for securing container 120 to an exterior wall 51 may therefore include final steps of rotating operating lever 202 to the locked rotational position to engage latch 240 with wall pin 231. And finally locking the lever in the locked rotational position via activating the lever lock 245.

Container 120 also includes a lock 80 similar to that previously described herein for locking the lid 127 in the closed position. Any suitable mechanical or electronic lock assembly may be used for this purpose.

To facilitate package delivery and tracking, one or more scannable tracking indicia such as bar codes may be provided on container 120. For example, the exterior of container 120 (e.g. on lid 127 or elsewhere) may include an identification bar code 250 which identifies the owner of the container who will be receiving the package delivery (see, e.g. FIG. 14). The delivery person may scan and enter this code into the delivery companies electronic tracking system as a first step. Once lock 80 is unlocked by the delivery person, a second electronic signature bar code 251 may be affixed to the underside of lid 127 or elsewhere on the interior of the container which can be scanned and entered into the tracking system if a signature is necessary for the package delivery (see, e.g. FIG. 12).

Figure 12:
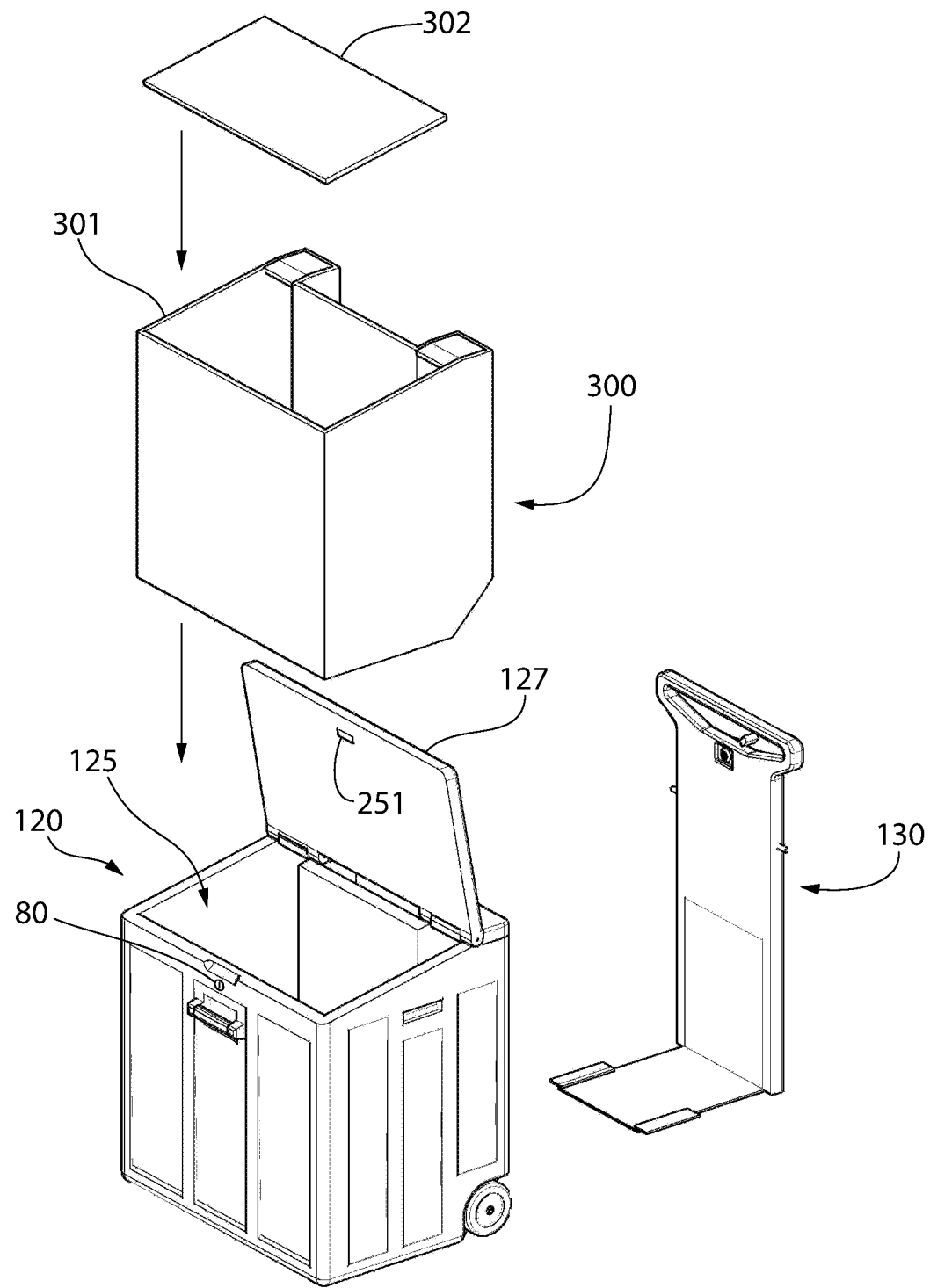
FIG. 12 is an exploded perspective view thereof showing an optional insulated liner system.

In some embodiment, the container 120 may optionally be insulated to maintaining the temperature of hot or cold delivered good. In one approach, an insertable and removable rigid liner 300 formed of a suitable thermal insulating material (e.g. STYROFOAM (closed-cell extruded polystyrene foam) or other) as shown in FIG. 12. The liner 300 is generally configured to fit the interior contours of and inside container 120. Liner 300 may include a body portion 301 for this purpose and a loose lid portion 302 which fits on top of the body portion for forming a fully insulated construction. In other embodiments, lid portion 302 may be affixed to the underside of lid 127. In other possible embodiments, container 120 may instead include an integrated insulation system comprising hollow walls and a lid filled with a suitable insulating material typically used to insulate commercially available consumer coolers. It is well within the ambit of those skilled in the art to select a suitable insulating material for this purpose. In other embodiments, container 120 may be uninsulated.

Integration with DIAD

All major delivery companies utilize a hand-held device to manage their deliveries. This device is known as a Delivery Information Acquisition Device ("DIAD"). The DIAD is a sophisticated handheld computer equipped with an infra-red bar code scanner that displays delivery information on a screen based on GPS (Global Positioning System) location. The DIAD provides specific information on each individual delivery and indicates how many packages are intended to be delivered or picked up at a particular location.

Upon arrival at a specified delivery location, the courier refers to the DIAD to determine the identity and quantity of packages for a particular delivery site. The DIAD will also indicate if the consumer has a container available for use. Once the courier approaches the container, the courier's DIAD will sync with the bar code located on the face of the container. Upon scanning the bar code with their DIAD, the courier will place the package(s) inside the container. Upon closing the container, the courier can trigger the battery-operated lock and an electronic notification will be sent to the consumer to indicate that the package has been delivered to their container.

This method of delivery can also serve as an "e-signature" if consumers are required to sign for certain packages, thus eliminating the need for customers to wait at home for packages or to travel to a delivery facility to retrieve packages.

Overall, customers will feel an increased sense of security, adding to greater sales and confidence in placing higher-value orders via mail order. In addition, the cost of replacing stolen or damages packages will decrease.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A secure package delivery system comprising:
   a container comprising:
   a multi-walled container body defining a front wall, a rear wall, a pair of sidewalls, and an interior cavity configured for receiving at least one package, the container further comprising:
   an openable and closeable lid coupled to the container body;
   a handle assembly comprising a base member slideably coupled to the container body and a vertical handle member, the handle assembly configured to form an adjustable upwardly open gap configured for receiving a lower portion of a door therein;
   the handle assembly horizontally movable forward into an inward position closing the gap and rearward into an outward position opening the gap;
   a crank mechanism mounted to the vertical handle member, the crank mechanism comprising a pair of locking pins operably coupled to a rotatable lever by a linkage, the locking pins laterally movable via rotating the lever between retracted and projected positions;
   wherein rotating the lever in a first direction to a first position when the handle assembly is in the inward position is capable of projecting the locking pins outwards to engage the rear wall and lock the handle assembly in the inward position;
   wherein rotating the lever in a second direction to a second position when the handle assembly is in the inward position is capable of retracting the locking pins inwards to disengage the rear wall and allow movement of the handle assembly to the outward position.

2. The system according to claim 1, further comprising:
   a rearwardly open rear channel recessed in the rear wall, the vertical handle member horizontally movable forward into and rearward out of the channel;
   at least one pair of locking holes formed in container body and facing inwards into the rear channel, the locking pins capable of being received in the locking holes when the lever is rotated in the first direction to lock the handle assembly in the channel in the inward position.

3. The system according to claim 2, wherein rotating the lever in the second direction is capable of retracting the locking pins from the locking holes when the handle assembly is in the inward position.

4. The system according to claim 1, wherein the linkage is a slider crank linkage comprising a first pin joint formed on the lever and a second pin joint formed on a reciprocatable slider mounted inside a guide sleeve, and a first link arm pivotably coupled to the first and second pin joints, the locking pins pivotably coupled to the second pin joint of the slider to move the locking pins between the retracted and projected positions when the slider reciprocates via rotating the lever.

5. The system according to claim 4, wherein each locking pin is pivotably coupled to the second pin joint of the slider via a respective lateral link arm.

6. The system according to claim 5, wherein the slider converts rotary motion of the lever to linear motion of the slider which in turn moves the locking pins between the projected and retracted positions.

7. The system according to claim 5, wherein rotating the lever in the first direction moves the slider downwards in the guide sleeve to project the locking pins, and moving the lever in the second direction moves the slider upwards in the guide sleeve to retract the locking pins.

8. The system according to claim 5, each of the locking pins is slideably received in a guide boss disposed on each lateral side of the vertical handle member.

9. The system according to claim 4, wherein the slider crank linkage is mounted internally within a cavity of the vertical handle member, and the lever is mounted adjacent to a top portion of the cavity and externally accessible to a user for rotating the lever.

10. The system according to claim 1, wherein rotating the lever about 90 degrees moves the locking pins between the projected and retracted positions.

11. The system according to claim 1, wherein the vertical handle member has a width at least one-third a width of the container body.

12. The system according to claim 11, wherein a top of the vertical handle member is terminated with a closed loop for grasping.

13. The system according to claim 3, wherein the vertical handle member is slideably coupled to the base member, the vertical handle member being vertically movable between an upper extended position and a lower collapsed position.

14. The system according to claim 13, wherein the base member is L-shaped including a planar horizontal securement portion slideably coupled to a bottom of the container body at the rear channel, and a planar vertical mounting portion received inside a downwardly open cavity in the vertical handle member to slideably couple the vertical handle member to the base member.

15. The system according to claim 14, wherein the vertical handle member is movable to the upper extended position when the locking pins are retracted from the locking holes, and the vertical handle member is lockable in the lower collapsed position when the locking pins are projected into the locking holes.

16. The system according to claim 15, wherein the base member and vertical handle member are horizontally movable relative to the container body in unison as a unit when the locking pins are in the retracted position, and the base member and vertical handle member are locked in the rear channel of the container body when the locking pins are in the projected position with the handle assembly in the inward position and the vertical handle member in the lower collapsed position.

17. The system according to claim 13, wherein the lever comprises a user-operated lock configured to lock the lever in the first position with the locking pins engaged with the locking holes when the vertical handle member is in the lower collapsed position.

18. The system according to claim 17, further comprising a second pair of locking holes formed in container body and facing inwards into the rear channel, the locking pins capable of being received in the second pair of locking holes when the lever is rotated in the first direction and the handle assembly is in the inward position to lock the vertical handle member in the upper extended position.

19. The system according to claim 1, wherein the base member of handle assembly is slideably coupled to the container body by a pair of parallel rails on the base member which slideably engage a corresponding external pair of parallel rails disposed on a bottom of the container body in a downwardly open recessed cavity.

20. The system according to claim 2, wherein the rear channel of the container body extends for a full height of the container body.

21. The system according to claim 13, wherein the vertical handle member further comprises a rearwardly open securement aperture arranged for receiving a wall pin configured for attachment to a wall, the securement aperture being configured to (i) receive the wall pin when the vertical handle member is in the upper extended position, and (ii) lock the wall pin to the container when the vertical handle member is in the lower collapsed position.

22. The system according to claim 21, the securement aperture includes an enlarged entrance portion configured to insert the wall pin therethrough, and a narrower locking portion configured to engage an enlarged terminal end of the wall pin to lock the container to the wall pin.

23. A secure package delivery system comprising:
   a wall pin;
   a container comprising:
      a multi-walled container body defining a front wall, a rear wall, a pair of sidewalls, and an interior cavity configured for receiving at least one package;
      an openable and closeable lid coupled to the container body;
      a handle assembly comprising a base member slideably coupled to the container body and a vertical handle member slideably coupled in turn to the base member;
      the vertical handle member horizontally movable forward and rearward relative to the rear wall between an inward position adjacent the rear wall, and an outward position spaced apart from the rear wall;
      the vertical handle member further vertically moveable relative to base member between upper extended and lower collapsed positions;
      the vertical handle member further comprising a rearwardly open securement aperture arranged for receiving the wall pin configured for mounting the container to a wall, the securement aperture including an enlarged entrance portion configured to receive the wall pin when the vertical handle member is in the upper extended position, and a narrower locking portion configured to lock the wall pin to the container when the vertical handle member is in the lower collapsed position.

24. The system according to claim 23, wherein when the vertical handle member is in the outward position, the handle assembly forms an adjustable upwardly open gap between the container body and vertical handle member configured for receiving a lower portion of a door therein.

25. The system according to claim 23, further comprising:
a rearwardly open vertical channel recessed in the rear wall of the container body which receives the vertical handle member when in its inward position, the open channel including a pair of locking holes formed in container body and facing inwards into the channel;
a crank mechanism mounted to the vertical handle member, the crank mechanism comprising a pair of locking pins operably coupled to a rotatable lever by a linkage;
the locking pins laterally movable via rotating the lever between:
  (i) a projected position engaging the locking holes which locks the vertical handle member in the inward and lower collapsed positions; and
  (ii) a retracted position disengaging the locking holes which allows vertical and horizontal adjustment of the vertical handle member.

26. The system according to claim 25, further comprising:
a hooked latch rotatably mounted to the vertical handle member proximate to the securement aperture, the hooked latch operably coupled to the linkage of the crank mechanism for rotating the hooked latch;
the hooked latch rotatable via rotating the lever in opposing directions between a latched position engaged with the wall pin when the wall pin is in the securement aperture, and an unlatched position disengaged from the wall pin when the wall pin is in the securement aperture.

27. The system according to claim 23, wherein:
the wall pin comprises a shaft including a mounting end configured for attachment to the wall and an opposite locking end terminated with a diametrically enlarged locking flange; and
wherein the enlarged entrance portion of securement aperture defines an opening larger than the locking flange for inserting the wall pin therethrough into the securement aperture, and the narrower locking portion defines an opening smaller than the locking flange for preventing removal of the container from the wall pin.

28. The system according to claim 27, wherein the narrower locking portion comprises a vertically elongated slot having a width smaller than the locking flange of the wall pin.

29. The system according to claim 23, further comprising hooked latch rotatably mounted to the vertical handle member proximate to the securement aperture, the hooked latch operably coupled to a rotatable lever, wherein rotating the lever in opposing directions moves the hooked latch between a latched position engaged with the wall pin when the wall pin is in the securement aperture, and an unlatched position disengaged from the wall pin when the wall pin is in the securement aperture.

30. A secure package delivery system comprising:
a container comprising a multi-walled container body defining a front wall, a rear wall, a pair of sidewalls, and an interior cavity configured for receiving at least one package, the container further comprising:
an openable and closeable lid coupled to the container body;
a vertically telescoping handle assembly comprising a base member slideably coupled to the container body and a vertical handle member slideably coupled to the base member;
a vertically-extending rear channel recessed in the rear wall, the vertical handle member horizontally movable forward and rearward into and out of the rear channel;
the handle assembly movable to form an adjustable upwardly open gap between the rear wall and the vertical handle member when the vertical handle member is positioned outside the rear channel for receiving a lower portion of a door therein;
a rearwardly open securement aperture formed in the vertical handle member, the securement aperture adjustable in vertical position via raising and lowering the vertical handle member;
the securement aperture including an enlarged entrance portion configured to receive a wall pin therethrough when the vertical handle member is in an upper extended position, and a narrower locking portion configured to lock the wall pin to the container when the vertical handle member is in a lower collapsed position; and
a crank mechanism mounted to the vertical handle member, the crank mechanism comprising a pair of locking pins operably coupled to a rotatable lever by a linkage;
the locking pins selectively movable via rotating the lever between a projected position engaging locking holes in the container body to lock the handle assembly in vertical position to the container, and a retracted position disengaged from the locking holes to allow vertical adjustment of the handle assembly.

* * * * *